United States Patent
Baig et al.

(10) Patent No.: US 7,459,084 B2
(45) Date of Patent: Dec. 2, 2008

(54) MEMBRANE-ASSISTED FLUID SEPARATION APPARATUS AND METHOD

(75) Inventors: Fakhir U. Baig, Oakville (CA); Abdul M. Kazi, Oakville (CA); Aiser Al-Hassani, Mississauga (CA)

(73) Assignee: Petro Sep International Ltd., Tortola (VG)

( * ) Notice: Subject to any disclaimer, the term of this patent is extended or adjusted under 35 U.S.C. 154(b) by 377 days.

(21) Appl. No.: 10/481,119

(22) PCT Filed: Jun. 21, 2002

(86) PCT No.: PCT/CA02/00933

§ 371 (c)(1),
(2), (4) Date: Jun. 14, 2004

(87) PCT Pub. No.: WO03/000389

PCT Pub. Date: Jan. 3, 2003

(65) Prior Publication Data

US 2004/0211726 A1    Oct. 28, 2004

(30) Foreign Application Priority Data

Jun. 22, 2001   (CA) .................................. 2,351,272

(51) Int. Cl.
*B01D 15/00* (2006.01)
*B01D 63/00* (2006.01)
*B01D 59/12* (2006.01)
*C02F 1/44* (2006.01)

(52) U.S. Cl. ............... 210/640; 210/321.8; 210/321.81; 210/321.9; 210/175; 95/52; 96/4

(58) Field of Classification Search ............ 210/321.6, 210/321.78, 321.79, 321.8, 321.81, 321.87, 210/321.89, 321.9, 652, 640, 175, 323.2; 96/4–10; 95/42, 46, 52

See application file for complete search history.

(56) References Cited

U.S. PATENT DOCUMENTS

| | | | | |
|---|---|---|---|---|
| 4,704,205 A | * | 11/1987 | Ishii | 210/323.2 |
| 4,732,673 A | * | 3/1988 | Dagard et al. | 210/247 |
| 4,846,973 A | * | 7/1989 | Barnard | 210/323.2 |
| 4,861,485 A | * | 8/1989 | Fecondini | 210/641 |
| 4,917,798 A | * | 4/1990 | Liou et al. | 210/321.89 |
| 4,992,170 A | * | 2/1991 | Menon et al. | 210/321.78 |
| 5,102,550 A | | 4/1992 | Pizzino et al. | |
| 5,108,464 A | * | 4/1992 | Friesen et al. | 95/52 |
| 5,183,566 A | * | 2/1993 | Darnell et al. | 210/321.8 |
| 5,202,023 A | * | 4/1993 | Trimmer et al. | 210/321.8 |
| 5,282,964 A | | 2/1994 | Young et al. | |
| 5,288,308 A | * | 2/1994 | Puri et al. | 96/8 |
| 5,352,272 A | * | 10/1994 | Moll et al. | 96/9 |
| 5,380,433 A | * | 1/1995 | Etienne et al. | 210/321.79 |
| 5,525,143 A | * | 6/1996 | Morgan et al. | 95/52 |
| 5,993,515 A | * | 11/1999 | Sirkar | 95/46 |
| 6,113,782 A | * | 9/2000 | Leonard | 210/321.89 |
| 6,210,464 B1 | | 4/2001 | Nakanishi et al. | |
| 6,755,975 B2 | * | 6/2004 | Vane et al. | 210/640 |
| 2002/0074277 A1 | | 6/2002 | Thomassen | |

FOREIGN PATENT DOCUMENTS

| | | |
|---|---|---|
| EP | 1 005 896 A1 | 6/2000 |
| WO | WO 00/72947 A1 | 12/2000 |
| WO | WO 01/76727 A1 | 10/2001 |

OTHER PUBLICATIONS

Database WPI, Week 198829, Derwent Publ. Ltd., London, GB; AN 1988-201169, XP002233733 & JP 63 137706 A ((HITA) Hitachi Ltd), Jun. 9, 1988.
Patent Abstracts of Japan, vol. 0113, No. 61 (C-459), Nov. 25, 1987 & JP 62 132502 A (Ube Ind Ltd), Jun. 15, 1987.
Patent Abstracts of Japan, vol. 1999, No. 11, Sep. 30, 1999 & JP 11 151431 A (Nikkiso Co Ltd), Jun. 8, 1999.
K. Ohta et al.: "Experiments on Sea Water Desalination by Membrane Distillation" Desalination, vol. 78, No. 2, 1990, p. 177-185, XP000173551, Amsterdam, NL.

* cited by examiner

*Primary Examiner*—Ana M Fortuna
(74) *Attorney, Agent, or Firm*—Dimock Stratton LLP

(57) ABSTRACT

This present invention relates to a fluid separation module adapted to separate a given fluid mixture into permeate and retentate portions using bundles of hollow fiber membranes. The membranes may be composed of different kinds of membranes depending on the application being used to separate the fluid mixture. The fluid separation module may be used to separate fluid mixtures by a number of different processes, including but not limited to, pervaporation, vapour permeation, membrane distillation (both vacuum membrane distillation and direct contact membrane distillation), ultra filtration, microfiltration, nanofiltration, reverse osmosis, membrane stripping and gas separation. The present invention also provides an internal heat recovery process applied in association with those fluid separation applications where separation takes place by evaporation through the membrane of a large portion of the feed into permeate. Desalination and contaminated water purification by means of vacuum membrane distillation are just two examples where the internal heat recovery process may be applied. In these two examples, large portions of the feed are separated by membranes into a high purity water permeate stream by evaporation through the membranes and into a retentate stream containing a higher concentration of dissolved components than present in the feed. In this process the permeate vapour that is extracted from the fluid separation module is compressed by an external compressor to increase the temperature of the vapour higher than the temperature of the feed entering the separation module. Heat from the permeate vapour at the elevated temperature is transferred back to the incoming feed fluid mixture entering the fluid separation module in a condenser/heat exchange.

41 Claims, 21 Drawing Sheets

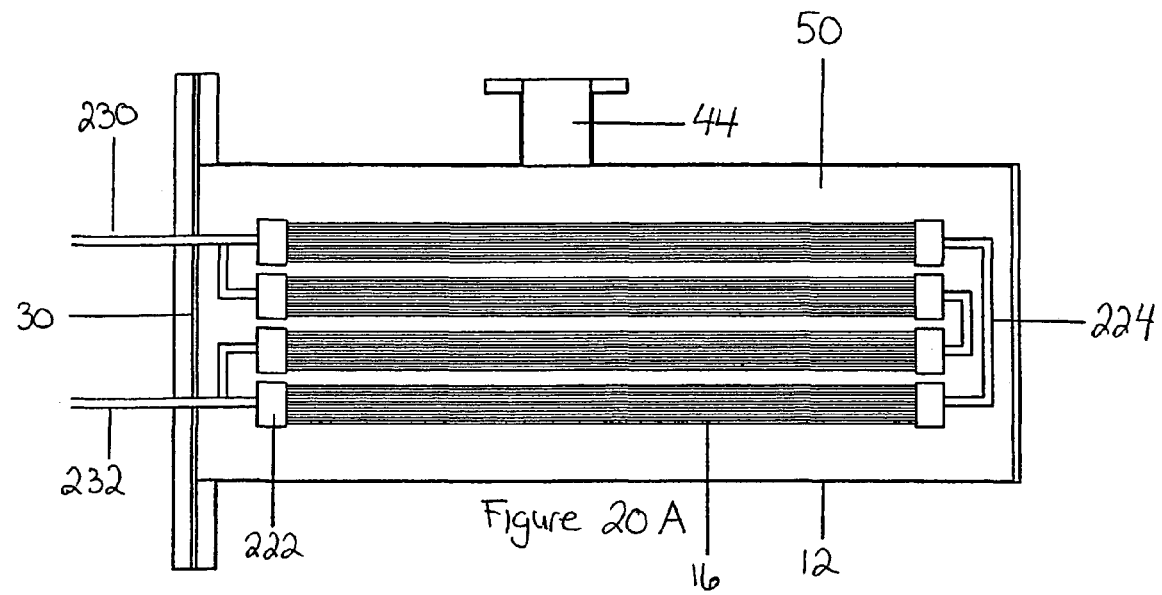
Figure 20 A
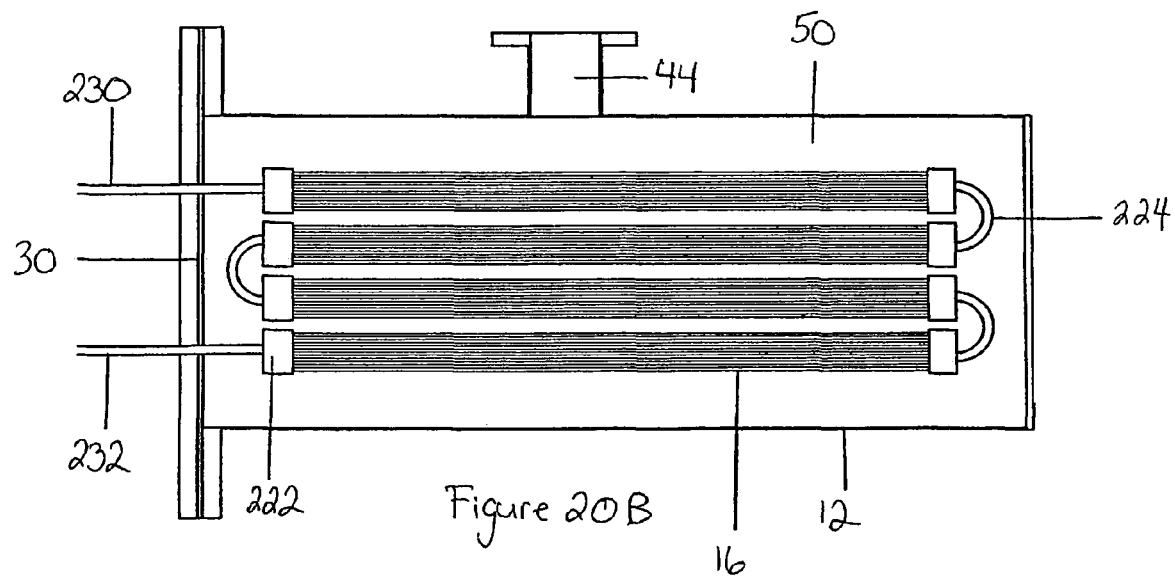
Figure 20 B
Figure 20

MEMBRANE-ASSISTED FLUID SEPARATION APPARATUS AND METHOD

FIELD OF THE INVENTION

This invention relates to fluid separation. In particular, this invention relates to a fluid separation apparatus comprising of hollow fiber membranes used in fluid processing and a method of fluid separation, including a method of internal heat recovery therein.

BACKGROUND OF THE INVENTION

Membrane-assisted fluid separation processes are used to separate fluid mixtures into permeate and retentate portions. These processes may be effected within fluid separation modules that contain a plurality of hollow fiber membranes arranged in an elongated bundle encased in a single shell containment housing. The conventional fluid separation modules using hollow fiber membranes may be configured in either a shell side feed design or a bore side feed design.

Typically, fluid separation modules containing a plurality of hollow fiber membranes arranged in a bundle have potting material, for example epoxy, or other suitable material covering a portion of the external surface of each membrane within a bundle, for purposes of securing the membranes within a module. If the resin is not properly applied and leakage of feed occurs from any of the membranes, such leakage results in the contamination of permeate extracted from the hollow interior of the membrane. Similarly, if leakage-occurs for any other reason, contamination of the fluid permeate results. Accordingly, one of the disadvantages of having a single module containing hundreds to thousands of membranes is that a defect in just one membrane renders the entire module, with all of the remaining intact membranes, useless.

In order to avoid this limitation, prior art devices use a large number of modules interconnected with one another in serial or parallel fashion, in order to increase the number of hollow membranes used and thus to increase the total membrane surface area across which a given fluid mixture can be separated into its constituent permeate and retentate portions. If leakage occurs in any module, it can be replaced while minimizing the number of usable membranes discarded in the process.

These prior art devices still present two major problems. First, if there is a defect in a given membrane within a module that houses a large number of hollow fiber membranes, the entire module containing the defective membrane must be replaced, resulting in the wastage of all other usable membranes in the defective module. Moreover, in many conventional membrane modules, the housing is made of expensive material or the physical size of said housing is so large that it renders the disposal of the housing for each module along with the membranes contained therein very uneconomical. Second, whether conventional modules are arranged in series or parallel fashion, extensive plumbing is necessary in order to connect the various modules and to remove the permeate and retentate from each module. This extensive plumbing adds significantly to the cost of manufacturing and maintaining these prior art devices. The plumbing also significantly adds to the complexity and bulkiness of these devices.

In general, thermally driven fluid separation processes within conventional membrane-assisted fluid separation modules, especially those processes in which there is a large fraction of liquid feed separated as permeate by evaporation through membranes, are very energy intensive and consuming.

FIG. 1 outlines the typical flow scheme for prior art vacuum membrane distillation operating within a conventional membrane-assisted fluid separation module. In a typical prior art membrane-assisted fluid separation module 2, permeate vapours exiting the separation module are first condensed in a condenser 4 by using a cooling fluid source such as cooling water. The condensed liquid and non-condensable portions of the permeate are then separated in a gas-liquid separation vessel 6. A vacuum pump 8 is attached to the gas-liquid separation vessel to pump out non-condensable portions of the permeate and to sustain a vacuum on the permeate side.

Extensive heat is required to preheat the feed to the temperature required for optimum operation and to provide heat for vaporization for the permeate. Also cooling means (for example, cooling water, chilled water) have to be provided to remove the heat from the permeate condenser. The operation of the process according to prior art is thus very energy intensive and wasteful, as the heat supplied is mainly lost in cooling means (e.g. cooling water etc.).

SUMMARY OF THE INVENTION

The present invention overcomes the above-mentioned problems of the prior art devices. Each bundle of hollow fiber membranes can be assembled prior to its insertion into the housing, no further processing of the bundles is required after being inserted into the housing, the overall fluid separation module design is easy to disassemble and each bundle within the housing can be replaced easily in straightforward manner. These are all desirable features for on-site service of membrane devices. Further, in the present invention, the need for extensive plumbing apparatus to remove the permeate from the module is minimized, which reduces the cost, complexity and maintenance requirements of the invention.

In a preferred embodiment of the invention, all of the bundles of hollow fiber membranes have a common feed chamber, common permeate chamber and common retentate chamber instead of being housed in separate modules interconnected by extensive plumbing. The feed fluid is thus introduced into the bundles of membranes in a parallel fashion, and the cumulative permeate is extracted from the separation housing in bulk. Consequently, there is significantly less plumbing apparatus required to introduce the feed fluid and to remove the permeate and retentate from the single fluid separation module. With this reduction of necessary plumbing, the costs of the present invention are substantially less than prior art devices and the present invention is easier to manufacture.

The present invention comprises a fluid separation module used to separate a fluid mixture into permeate and retentate portions. While two important applications for the present invention are desalination of seawater by means of membrane distillation and removal of VOCs from water by means of vacuum membrane distillation or pervaporation, the apparatus can be used for a number of different fluid separation processes including, but not limited to, pervaporation, vapour permeation, membrane distillation (both vacuum membrane distillation and direct contact membrane distillation), ultra filtration, microfiltration, nanofiltration, reverse osmosis, membrane stripping and gas separation.

In the preferred embodiment of the invention, the fluid separation module comprises a hollow housing that contains a plurality of elongate hollow fiber membranes arranged in one or more bundles. Unlike conventional prior art devices, each bundle is not encased in its own housing. The bundle or bundles of hollow fiber membranes are oriented in an axial direction within the housing.

Depending on the fluid separation process being used, the housing may operate at a range of pressures from elevated pressures to vacuum conditions. In a first embodiment, the hollow housing has a first open end and an axially opposite second open end which are covered by a first seal member and a second seal member, respectively. The first seal member at the first open end of the housing contains openings through which the ends of the hollow fiber membranes within each bundle are exposed and communicate with the feed side of the seal member, covered by a first endcap. An open region is thus created between the interior of the first endcap and the first seal member. Similarly, the second seal member at the second open end of the housing contains openings through which the second end of the hollow fiber membranes within the each bundle are exposed and communicate with the other side of the seal member, covered by a second endcap. An open region is thus created between the interior of the second endcap and the second seal member.

In an alternative embodiment of this invention, the housing has one open end. This opening is covered and sealed by a sealing member such as a removable endplate. At least one feed inlet passes through the removable endplate and communicates with the bundle or bundles of membranes contained in the housing. At least one retentate outlet passes through the removable endplate and communicates with the interior of the housing. Although, plumbing is required to interconnect the ends of bundles of membranes, significantly less plumbing is required to extract permeate from the common housing of this invention as opposed to the plumbing required to extract permeate from the interconnected modules found in the prior art.

In the shell side feed configuration of the present invention, the housing contains at least one feed inlet through which feed is introduced to the interior of the housing. Once inside the housing, the feed is introduced to the outside of the bundles of hollow fiber membranes and the permeate migrates through the membrane walls into the lumen of the hollow fiber membranes. The permeate exits through the end of the hollow fiber membranes, usually at the end that is longitudinally distant from the fluid inlet. The pressure outside the membranes is maintained higher than the pressure within the lumen of the membranes. The housing also contains at least one retentate outlet through which retentate exits the housing.

In the bore side feed configuration of the present invention, the feed is introduced into the lumen of the hollow fiber membranes at one end and the permeate migrates through the membrane wall to the outside of the membrane. The retentate remains in the lumen and exits the other end of the hollow membranes. The pressure on the outside of the membranes is maintained lower than the pressure within the lumen of the membranes.

Although the shell side feed configuration differs from the bore side configuration as to where the feed enters the hollow fiber membranes and where the permeate and retentate are removed from the housing, the structure of the housing, the principles for operating the fluid separation module, and principles of heat recovery all remain the same in both configurations.

The present invention also provides a method of fluid separation which comprises a method for internal heat recovery, feasible for applications where membrane-assisted fluid separation involves a large portion of the feed evaporating through the membranes into permeate. Desalination of salt water and purification of contaminated water by means of vacuum membrane distillation are just two examples of situations where the internal heat recovery process may be applied. In these two examples, large portions of the feed is separated by membranes into a high purity water permeate stream by evaporation through the membranes and into a retentate stream containing a higher concentration of dissolved components than present in the feed.

In the internal heat recovery method taught by the present invention, permeate water vapour that is extracted from the fluid separation module is compressed by an external compressor to increase the temperature of the water vapour. This increased heat is then transferred back to the incoming feed fluid mixture entering the fluid separation module by means of a condenser/heat exchanger. By extracting heat from the permeate, the internal heat recovery process recycles most of the heat used during the separation process. A minimal amount of energy is required to operate the compressor to compress the permeate vapours. The energy required for compression is low as compared to the total heat transferred within the internal heat recovery process. As such, the method of the invention utilizes energy efficiently in relation to prior art apparatus.

The present invention thus provides a fluid separation apparatus comprising: a hollow housing defining a separation chamber, having at least one permeate outlet to permit one or more permeate components of the feed fluid mixture to exit the housing; at least one feed inlet for feeding a fluid mixture into the housing; at least one bundle of hollow fiber membranes contained within the housing having first and second open ends, the first ends being in fluid communication with a feed inlet; and at least one retentate outlet to permit one or more non-permeate components of the feed fluid mixture to exit the fluid separation module, whereby the feed fluid mixture passes through the hollow fiber membranes such that the one or more permeate components of the feed fluid mixture migrate across the walls of the membranes to a permeate region defined between the fiber membranes and an interior wall of the housing, and the one or more retentate portions of the feed fluid mixture pass along the length of the membranes to the retentate outlet.

In further aspects of the apparatus of the invention: a housing wherein the ends of a bundle of hollow fiber membranes are each secured by a holding member comprising of a tube sheet, such that the ends of the hollow fiber membranes are exposed to the feed inlet and retentate outlet, respectively; the bundle of hollow fiber membranes is supported along its length by at least two telescoping rods, each rod comprising two or more rod portions interlocking in sliding relation; each rod consists of at least three rod portions, comprising two end rods each having one end fixed into the medial surface of a holding member and a medial rod, whereby opposite ends of the medial rod engage the two end rods in a telescoping relation; the two open ends of the housing are sealed by first and second sealing members respectively, each sealing member comprising openings through which the ends of the bundle of membranes is inserted, whereby the ends of the hollow fiber membranes are exposed to a region external to each sealing member; each end of the bundle of membranes is secured by a holding member having a threaded portion, and the bundle is secured to each sealing member by threaded members engaging the threaded portions of the holding members; the bundle of hollow fiber membranes is encased in a sleeve that has openings, to protect the physical integrity of the hollow fiber membranes contained within said sleeve but allowing the passage of fluids through the sleeve; a first endcap is secured to an inlet end of the housing such that a feed inlet region is defined between the first endcap and the first sealing member; a second endcap is secured to an outlet end of the housing such that a retentate outlet region is defined between the second endcap and the second sealing member; the first endcap comprises a feed inlet; retentate exits the fiber membranes through the retentate outlet region; the second endcap comprises a retentate outlet; permeate traverses the walls of the hollow fiber membranes by means of pervaporation, vapour permeation, membrane distillation including vacuum membrane distillation, direct contact membrane distillation, ultra filtration, microfiltration, nanofiltration, reverse osmosis, membrane stripping, gas separation or a combination thereof; a first heating area is defined between the first endcap and the first sealing member and a second heating area is defined between the second endcap and the second sealing member, the first and second heating areas each providing at least one heating fluid inlet and at least one heating fluid outlet to allow the passage of heated fluid therethrough; the feed inlet passes through the first endcap and supplies feed fluid mixture directly to the end of at the bundle of hollow fiber membranes in fluid-tight relation; the ends of the bundles of hollow fiber membranes are interconnected in fluid-tight communication by conduits to create a series of serially connected bundles of hollow fiber membranes through which the feed fluid mixture is conveyed to the retentate outlet; the conduits are disposed within the first and second heating areas; the feed fluid mixture is heated within the conduits by heated fluid passing over said conduits within the first and second heating areas; the feed fluid mixture is separated into permeate and retentate portions by means of pervaporation, vapour permeation, membrane distillation including vacuum membrane distillation, direct contact membrane distillation, ultra filtration, microfiltration nanofiltration, reverse osmosis, membrane stripping, gas separation or a combination thereof; the feed inlet passes through the first endcap and supplies feed fluid mixture directly to the end of at the bundle of hollow fiber membranes in fluid-tight relation; the ends of the bundles of hollow fiber membranes are interconnected in fluid-tight communication by conduits to create a series of serially connected bundles of hollow fiber membranes through which the feed fluid mixture is conveyed to the retentate outlet; the conduits are disposed within in the first and second heating areas; the feed fluid mixture is heated within the conduits by heated fluid passing over said conduits within the first and second heating areas; the feed fluid mixture is separated into permeate and retentate portions by means of pervaporation, vapour permeation, membrane distillation including vacuum membrane distillation, direct contact membrane distillation, ultra filtration, microfiltration nanofiltration, reverse osmosis, membrane stripping, gas separation or a combination thereof.

The present invention also provides a fluid separation apparatus comprising: a hollow housing defining a separation chamber, having at least one feed inlet to permit a fluid mixture to enter into the housing and at least one permeate outlet to permit the permeate to exit the housing; at least one bundle of hollow fiber membranes contained within the housing having first and second open ends, the first ends being in fluid communication with the permeate outlet; and at least one retentate outlet to permit one or more non-permeate components of the feed fluid mixture to exit the separation chamber; whereby the feed fluid mixture passes through the separation chamber such that the one or more permeate components of the feed fluid mixture migrate across the walls of the membranes into the lumen of the hollow fiber membranes and exit the housing through the permeate outlet, and one or more of the retentate portions remaining in the housing exits the housing through the retentate outlet.

The present invention further provides a method for fluid separation using membrane distillation, wherein a feed fluid is separated into permeate and retentate components, comprising the steps of: compressing permeate exiting a permeate outlet of a separation chamber, to create a compressed permeate; transferring heat of compression from the compressed permeate to the feed fluid in a condenser; and maintaining an operating pressure of the condenser by means of a vacuum pump in fluid communication with said condenser.

The present invention further provides a method for separating fresh water from saltwater utilizing the module of claim 39, comprising the steps of: heating a saltwater feed entering the fluid membrane separation module; separating a permeate of water vapour from the saltwater under vacuum or vacuum-like conditions; passing the water vapour through a blower to compress the water vapour and thereby increase temperature; passing the heated water vapour through a heat exchanger to heat the saltwater feed and condense the water vapour; and collecting the condensed water.

In further aspects, the method of the invention is used for the removal and recovery of fresh water from seawater by means of membrane distillation; or for the removal of volatile organic compounds from water by means of membrane distillation or pervaporation.

BRIEF DESCRIPTION OF THE DRAWINGS

In drawings which illustrate by way of example only preferred embodiments of the invention.

FIG. 20A is a schematic elevation of the fluid separation module of FIG. 16 with a combination of series and parallel-connected bundles.

FIG. 20B is a schematic elevation of the fluid separation module of FIG. 16 with a combination of serially-connected bundles.

DETAILED DESCRIPTION OF THE INVENTION

The present invention provides a fluid separation module used to separate fluid mixtures into permeate and retentate portions by means of membranes adapted for fluid separation. The fluid separation module may be used to perform any membrane-assisted fluid separation processes including but not limited to, pervaporation, vapour permeation, membrane distillation (both vacuum membrane distillation and direct contact membrane distillation), ultra filtration, microfiltration, nanofiltration, reverse osmosis, membrane stripping and gas separation or a combination of any of these processes.

Figure 2:
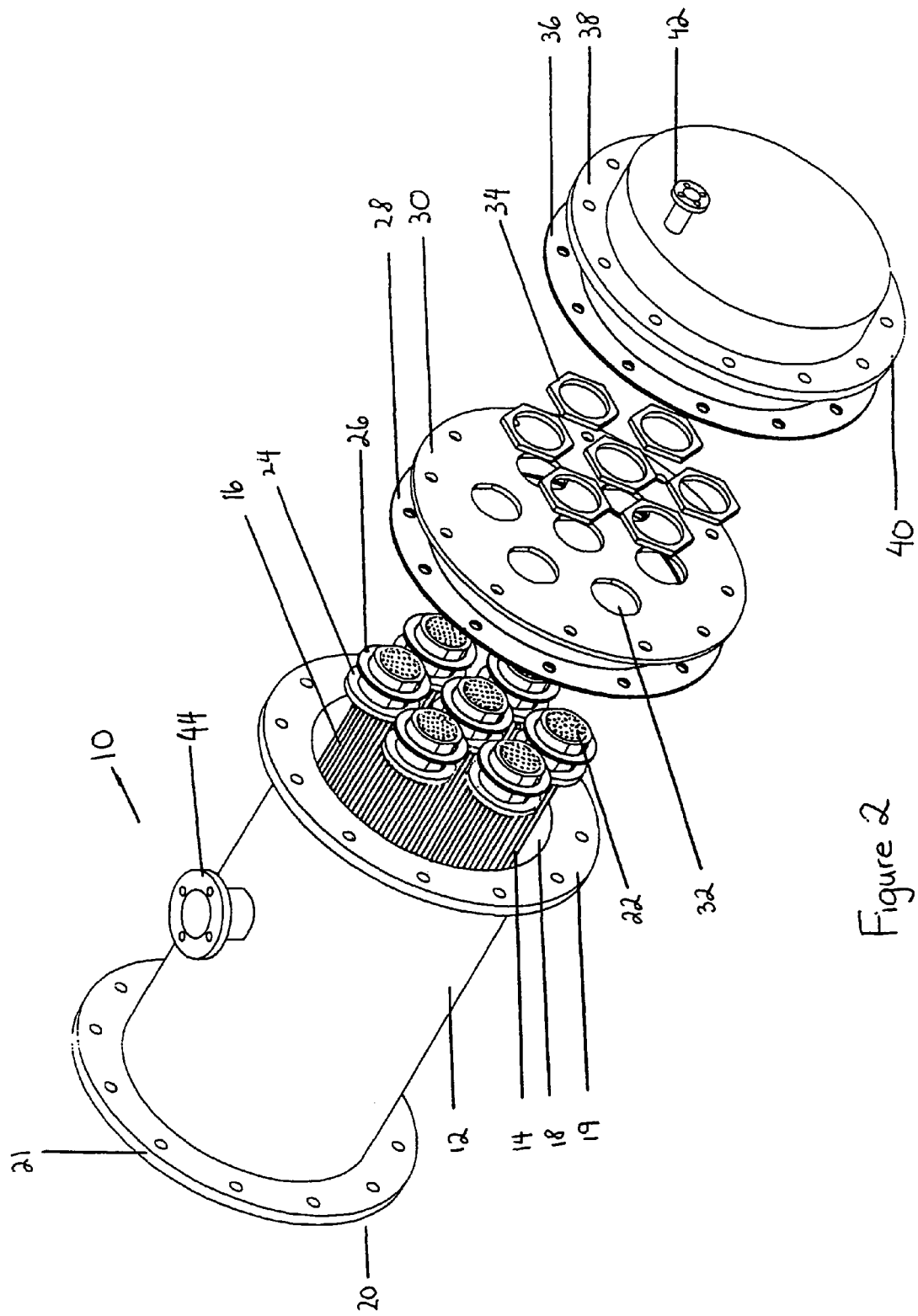
FIG. 2 is a perspective view of a preferred fluid separation module of the invention containing a plurality of bundles of hollow fiber membranes.

FIG. 2 illustrates a first preferred embodiment of the fluid separation apparatus 10 of the invention. The apparatus 10 comprises a hollow housing 12 that contains within the lumen of the housing 12, a plurality of elongate hollow fiber membranes 14 which are grouped in at least one bundle 16. Preferably, the housing 12 will contain a plurality of bundles of hollow fiber membranes 16. The bundles 16 are oriented axially within the housing 12. The housing 12 is preferably made of stainless steel, plastic or any other suitable material which is capable of protecting the fluid separation module from the environment, capable of withstanding the operating temperatures and pressures under which the separation process is effected and will not corrode or decompose to contaminate the fluids contained within the module.

The housing 12 has a first end 18 and a second end 20. A permeate outlet 44 is located along the body of the housing 12 allowing the lumen of the housing 12 to communicate with the pumping system external to the housing 12, to extract the permeate from the housing 12. For certain fluid separation processes, such as pervaporation, vapour permeation and membrane distillation, the separation of the fluid mixture within the lumen of the housing 12 will operate under vacuum or vacuum-like conditions as described below.

The hollow fiber membranes 14 are all approximately the same length and preferably range in length from about 5 cm to about 2000 cm, preferably about 10 cm to about 200 cm and most preferably between about 50 to about 150 cm. The diameter of the hollow fiber membranes will preferably range from about 0.1 mm to about 50 mm.

Figure 3:
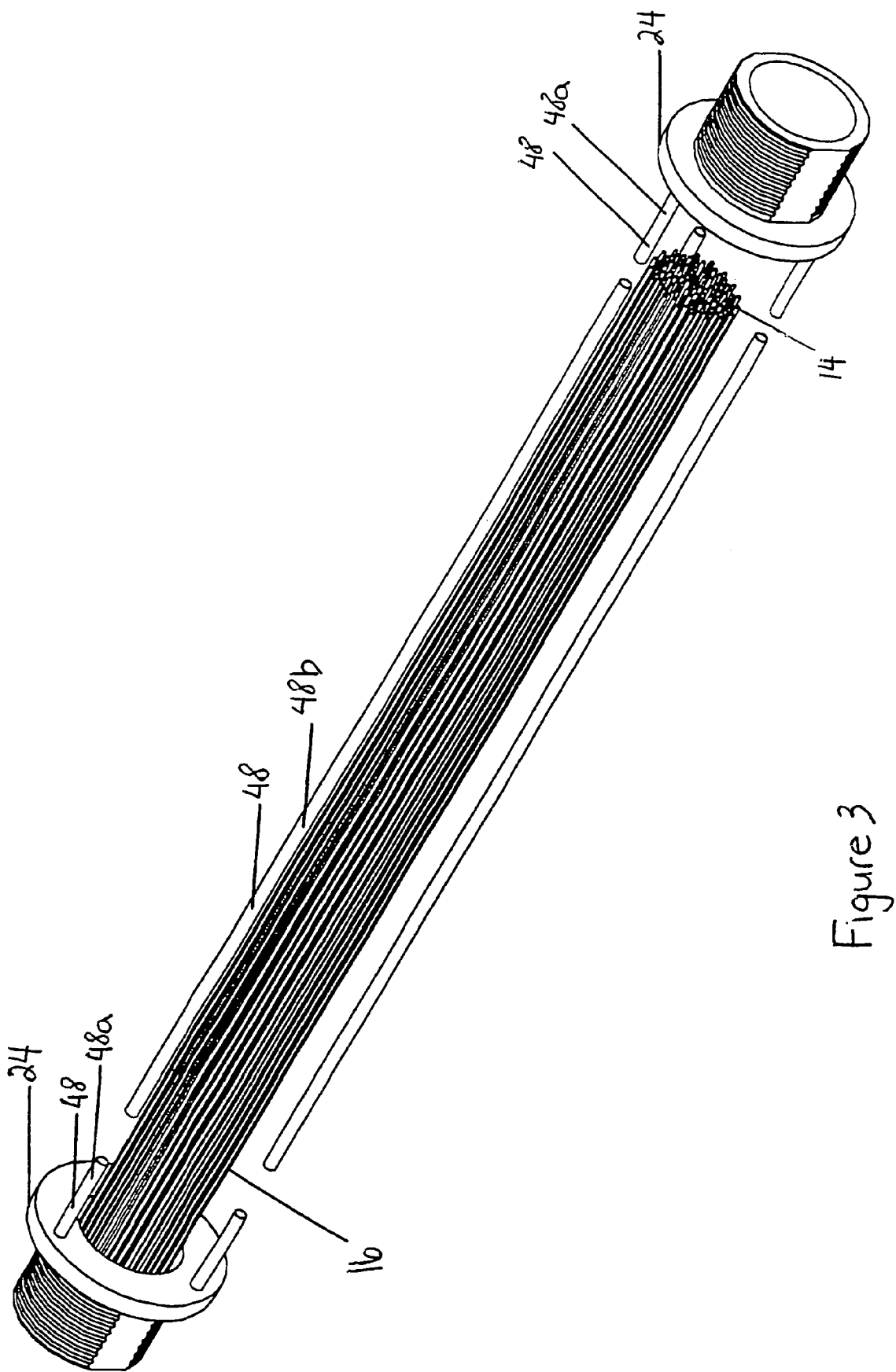
FIG. 3 is an exploded perspective view of a single bundle of hollow fiber membranes in the module of FIG. 2.
Figure 4:
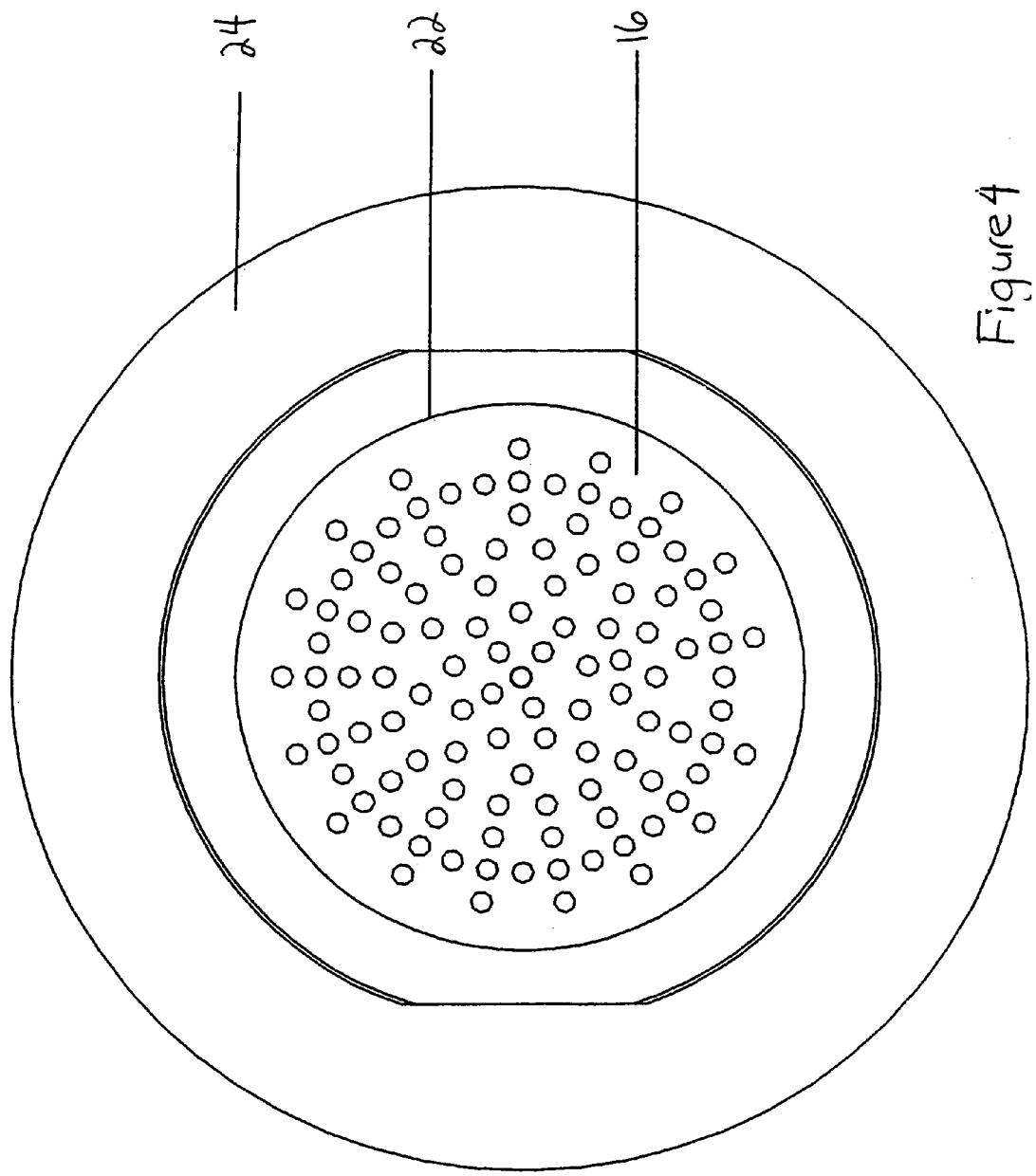
FIG. 4 is a front elevational view of an end of the bundle of hollow fiber membranes of FIG. 3.

Each hollow fiber membrane 14 has a first end and a second end. FIGS. 2 and 4 show one end 22 of a bundle 16 of hollow fiber membranes 14. The ends 22 of the bundle 16 of hollow fiber membranes 14 are embedded in a tube sheet 46 formed by potting material, for example epoxy or other suitable material. Moreover, each bundle 16 of hollow fiber membranes 14 is held together at both the first and second ends by a holding member, for example, a bundle end connector 24, as shown in FIG. 3, which also serves to secure the bundle 16 within the housing 12. The ends 22 of each hollow fiber membrane 14 within a given bundle 16 are inserted through the lumen of a bundle end connector 24 such that the ends 22 of the hollow fiber membranes 14 are approximately flush with the outer end of the bundle end connector 24. The ends 22 of the hollow fiber membranes 14 are secured in place within the lumen of the bundle end connector 24 by potting material, for example, epoxy or other suitable material 46, best seen in FIG. 3, forming a tube sheet which surrounds the ends 22 of the hollow fiber membranes 14 but does not impinge into the lumen of the hollow fiber membranes 14. The ends 22 of the bundle 16 of hollow fiber membranes 14 are thus exposed through the tube sheet 46 such that the ends may communicate with the region on the other side of the tube sheet 46 opposite the fiber bundle 16. The tube sheet 46 at the bundle end connector 24 is created by processes well known in the art.

As shown in FIG. 3, each bundle 16 of hollow fiber membranes 14 is preferably supported by two or more telescoping rods 48. Each telescoping rod 48 consists of two or more rod portions, with adjacent portions interlocking in sliding relation to allow the rods 48 to be shortened or lengthened as required. FIG. 3 illustrates the preferred embodiment, which includes three telescoping rods 48. Preferably, each telescoping rod 48 consists of three rod portions, including two end rods 48a each having one end fixed into the medial surface of bundle end connector 24. The two end rods 48a are connected by a medial rod 48b such that the opposite ends of the medial rod 48b engage the two end rods 48a in telescoping relation.

As shown in FIG. 3, the telescoping rods 48 provide structural support to each bundle 16 of hollow fiber membranes 14. Thus, while prior art devices encase each bundle of hollow fiber membranes in a single housing, according to the present invention no individual casing is required to surround a single bundle of hollow fiber membranes 14 and the telescoping rods 48 provide the necessary structural support. The telescoping rods 48 also provide adjustability of the bundle 16 in the axial direction. This adjustability is useful because, while the ends 22 of the fibers 14 should be precisely aligned at the ends of the bundle 16, it is difficult to cut the fibers 14 with the precision necessary to ensure that each is exactly the length corresponding to the distance between bundle support plates 30. Thus, once the bundle end connectors 24 are adhered to the fibers 14, the telescoping rods 48 allow the bundle 16 to be compressed axially in order to precisely fit within the length of the housing 12 during module assembly without detracting from the structural integrity of the bundle 16. The telescoping rods 48 also provide flexibility to expand axially when the threaded bundle retainer 34 are tightened as said retainer 34 pulls the bundle end connecters 24 which in turn pulls the fiber bundles 16 outwardly. Individual hollow fiber membranes 14 within a bundle 16 that may be slightly longer than other membranes 14 within the same bundle 16 will splay outwardly slightly to accommodate the adjustment, with no material effect on the operation of the invention.

As shown in FIG. 2, the housing 12 has two open ends 18 and 20 both of which are sealed by means of a gasket 28 and a sealing member, for example, a bundle support plate 30. A similar gasket 28 and bundle support plate 30 seals the open end 20 of the housing 12. The bundle support plate 30 provides bundle end openings 32 for each bundle 16 contained within the lumen of the housing 12. Surrounding the narrower portion of the bundle end connector 24 is a bundle sealing ring 26. A flange portion of the bundle end connector 24 has a diameter larger than the narrower portion of said connector. The narrower portion of the bundle end connector 24 is inserted into the bundle opening 32 and the bundle sealing ring 26 abuts the face of the bundle support plate 30 facing the interior of the housing 12. The entire open end 18 of the housing 12 is sealed by securing the gasket 28, and in turn the bundle support plate 30, to the flange 19 that extends outwardly from the open end 18 of the housing 12. At least part of narrower portion of each bundle end connector 24 is threaded, upon which threaded bundle retainers, for example nuts 34, are engaged to secure the bundles 16. The narrower portion of the bundle end connectors 24 thus protrude through the bundle end opening 32 of the bundle support plates 30, and the bundle sealing ring 26 forms a seal between the bundle end connectors 24 and the inner face of the bundle support plate 30 by fastening the threaded bundle retainers 34 to secure the bundles 16. The interior of the housing 12 is thus sealed with the ends 22 of the fiber hollow fiber membranes 14 exposed beyond the bundle support plate 30 and contained within the open regions between the bundle support plates 30 and the endcaps 40.

The housing 12 further comprises endcaps 40 located at either end of the housing 12. FIG. 2 illustrates the inlet endcap 40 which, along with gasket 36, bundle support plate 30 and gasket 28, engages and is secured to the flange 19 of the housing 12 by means of bolts or any other suitable fastening means. Once secured to the housing 12, the open region defined between the bundle support plate 30 and the inlet endcap 40 defines the feed inlet region 54 manifold, best seen in FIG. 5. The inlet endcap 40 contains a feed inlet 42 which permits access into the feed inlet region 54. The structure and attachment of the outlet endcap 41 at the second open end 20 of the housing 12 is the same as described above as illustrated in cross-sectional view in FIG. 4, with the open region created by the outlet endcap 41 and the second bundle support plate 43 defining a retentate outlet region 56, and the outlet endcap 41 provides a retentate outlet 48 which connects the retentate outlet region 56 with the environment external to the module 10.

Figure 5:
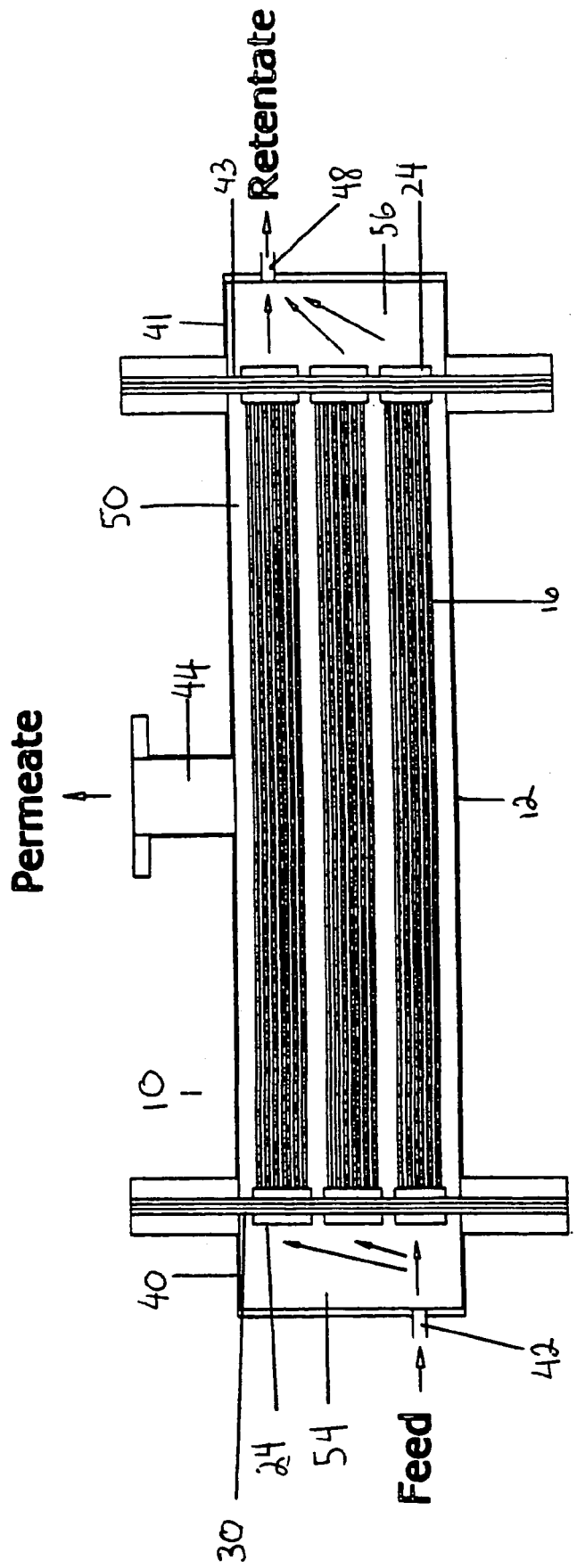
FIG. 5 is a cross-sectional elevation of one preferred embodiment of the fluid separation module.

Once the housing 12 is sealed, the regions beyond the bundles 16 of hollow fiber membranes 14 within the main chamber of the housing 12 defines a permeate outlet region 50 (see FIG. 5). Permeate which migrates through the bundle or bundles 16 of hollow fiber membranes 14 from within the lumen of the membranes 14 collects in the permeate outlet region 50 before exiting the module 10 through the permeate outlet 44.

Figure 6:
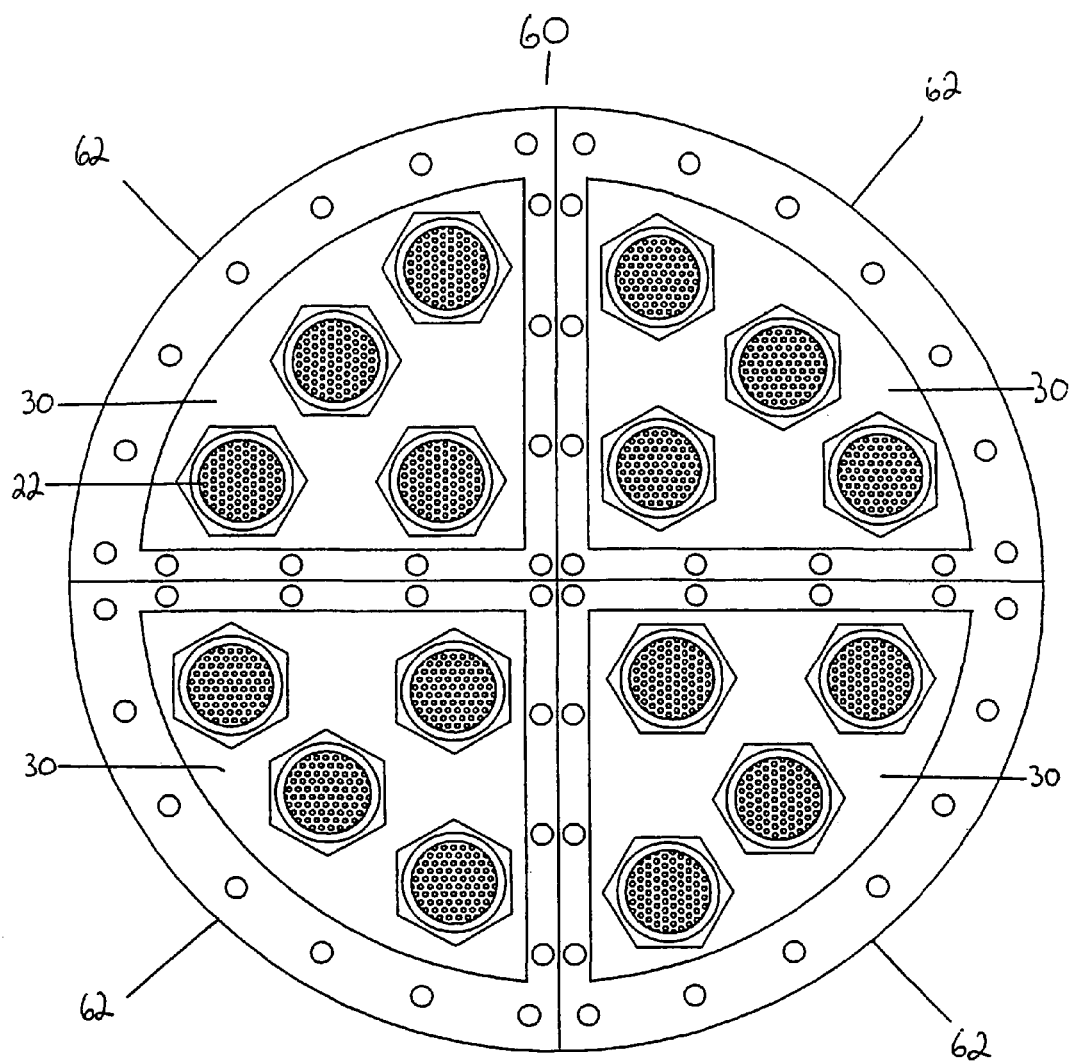
FIG. 6 is a cross-sectional view of an alternative embodiment of the fluid separation module.
Figure 7:
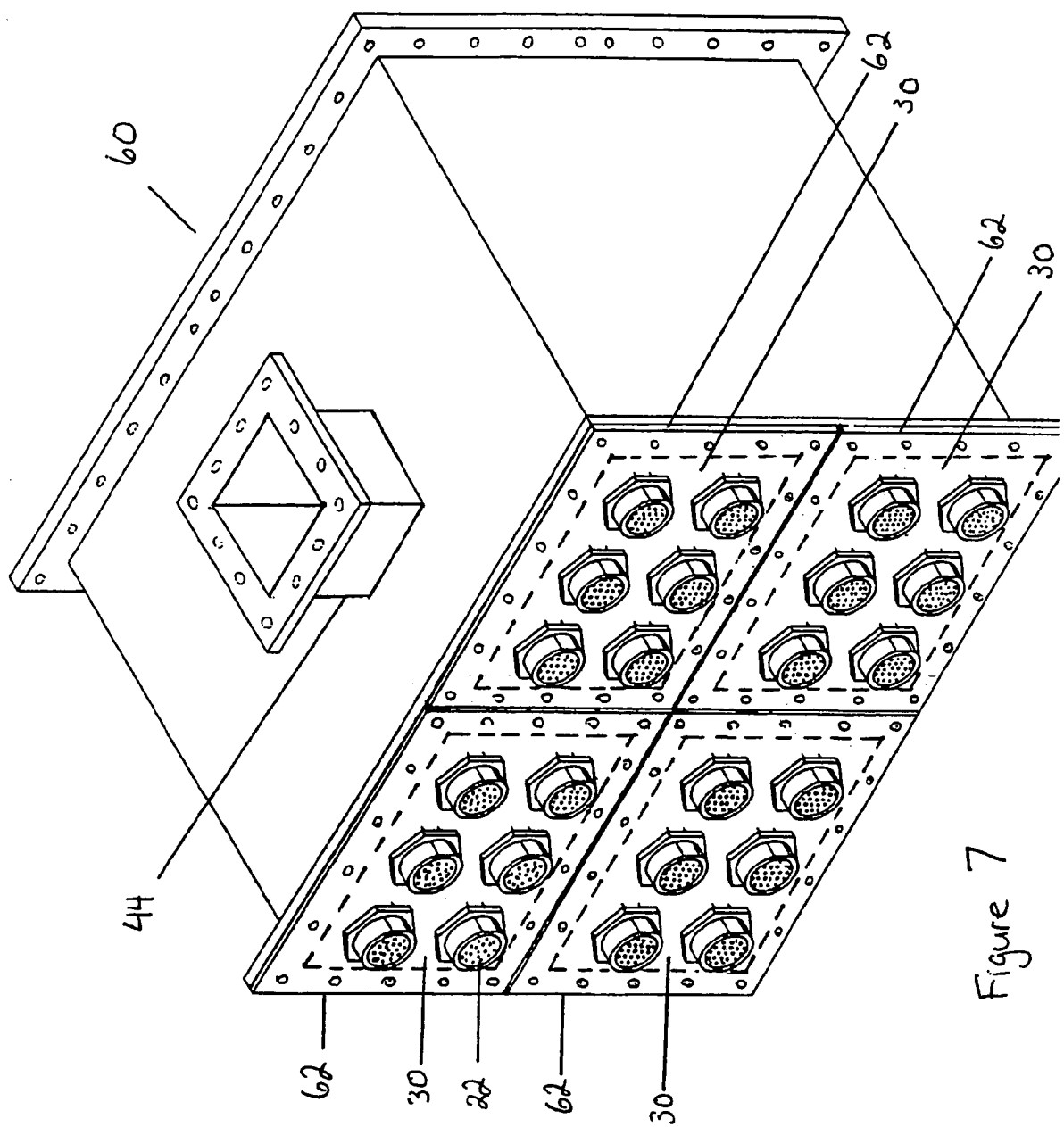
FIG. 7 is perspective view of a further alternative embodiment of the fluid separation module.

As illustrated in FIGS. 6 and 7, alternate configurations of the fluid separation module 10 consist of plurality of bundle support plates 30 sharing one common housing 12. Each of the bundle support plate 30 supports a single or a plurality of bundles 16. The common housing may have a common feed chamber, common permeate chamber and common retentate chamber. Alternatively, each support plate 30 may have attached to it its own feed chamber and retentate chamber, but the housing 12 containing a common permeate chamber. This feature provides the advantage of permitting access to each individual bundle plate 30 for servicing, for initial installation of bundles 16, and for allowing different fluid mixture to be fed through each individual feed chamber.

For a system requiring large membrane area, the total number of bundles 16 can be significant. These alternate arrangements help to keep the total number of hollow fiber bundles 16 attached to an individual bundle support plate to within reasonable limits. The housing 12 may have a plurality of feed inlets, retentate outlets and permeate outlets. Where the single housing 12 contains a plurality of bundle support plates 30 then support for the non-circumferential edges of these support plates 30 will be provided by additional support and fastening means.

Figure 12:
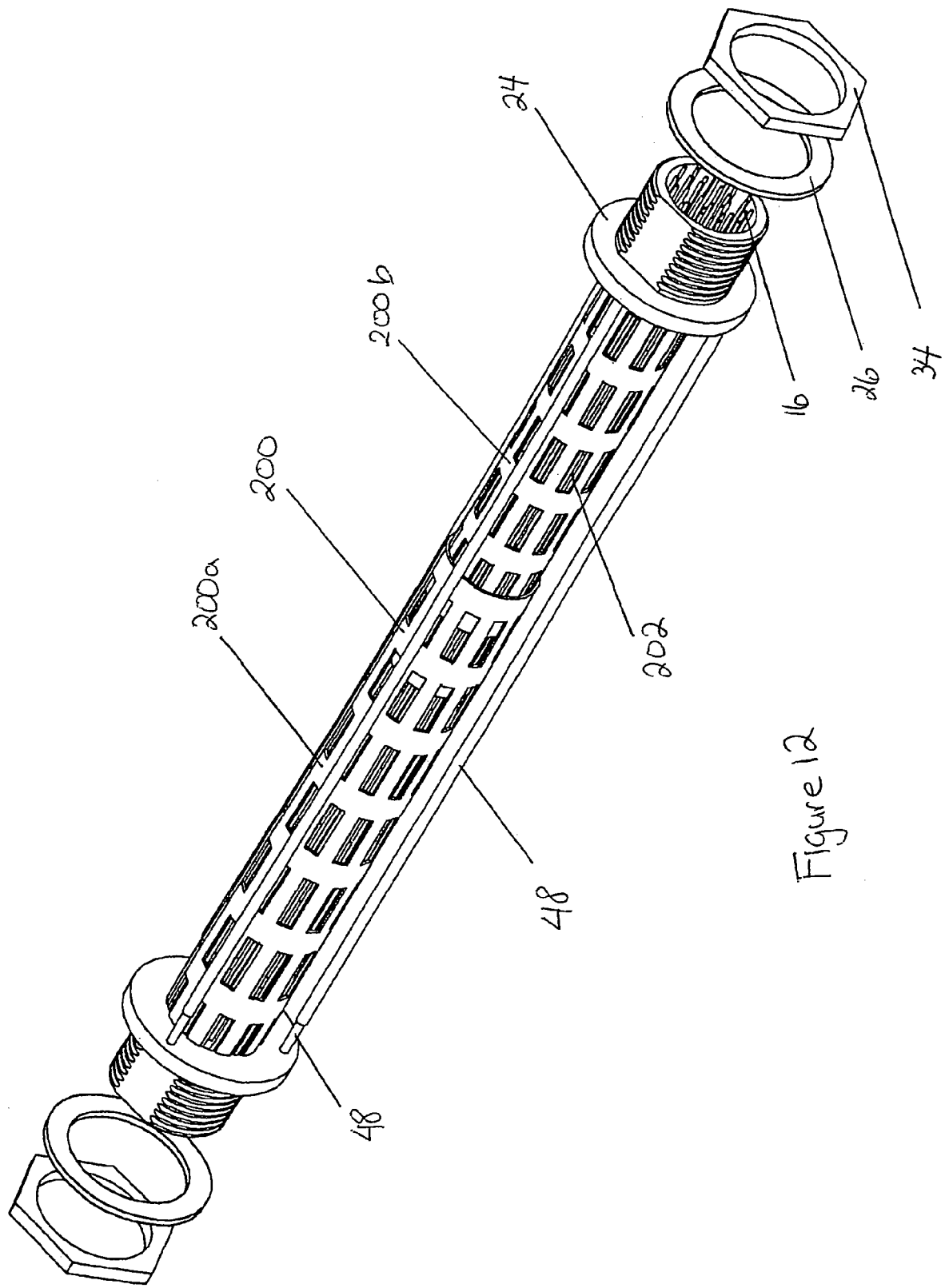
FIG. 12 is a perspective view of an embodiment of the single bundle of hollow fiber membranes having a telescopic protective casing.
Figure 13:
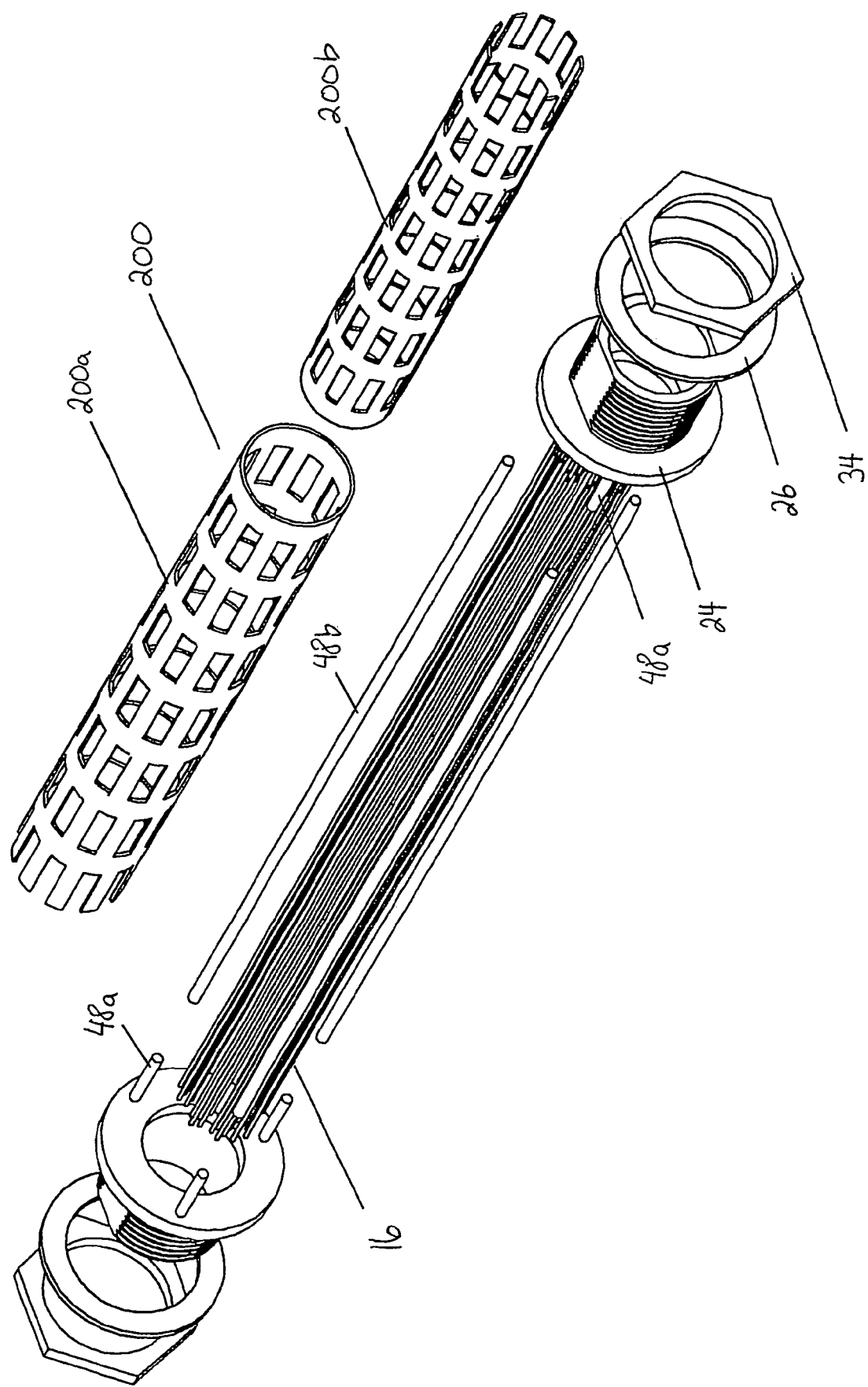
FIG. 13 is an exploded perspective view the bundle of hollow fiber membranes illustrated in FIG. 12.

In one alternative embodiment, the bundle of membranes 16 are encased in a sleeve 200 that is knitted, perforated, porous or otherwise has openings 202 as shown in FIG. 12. The purpose of the sleeve 200 is to protect the physical integrity of the hollow fiber membranes 14 contained within the sleeve 200 but still allow the passage of fluids through the sleeve 200 such that there maybe fluid communication between the hollow fiber membranes 14 and the interior of the housing 12. The sleeve 200 is made of plastic, metal or other suitable material that will not corrode or decompose contaminating the fluids contained within the module. To maintain the adjustability of the bundle 16 of membranes, the sleeve 200 may consist of two or more elements as shown in FIGS. 12 and 13 as 200a and 200b, that move telescopically in relation to one another. The telescopic rods 48 may or may not be present in this alternative embodiment.

Figure 14:
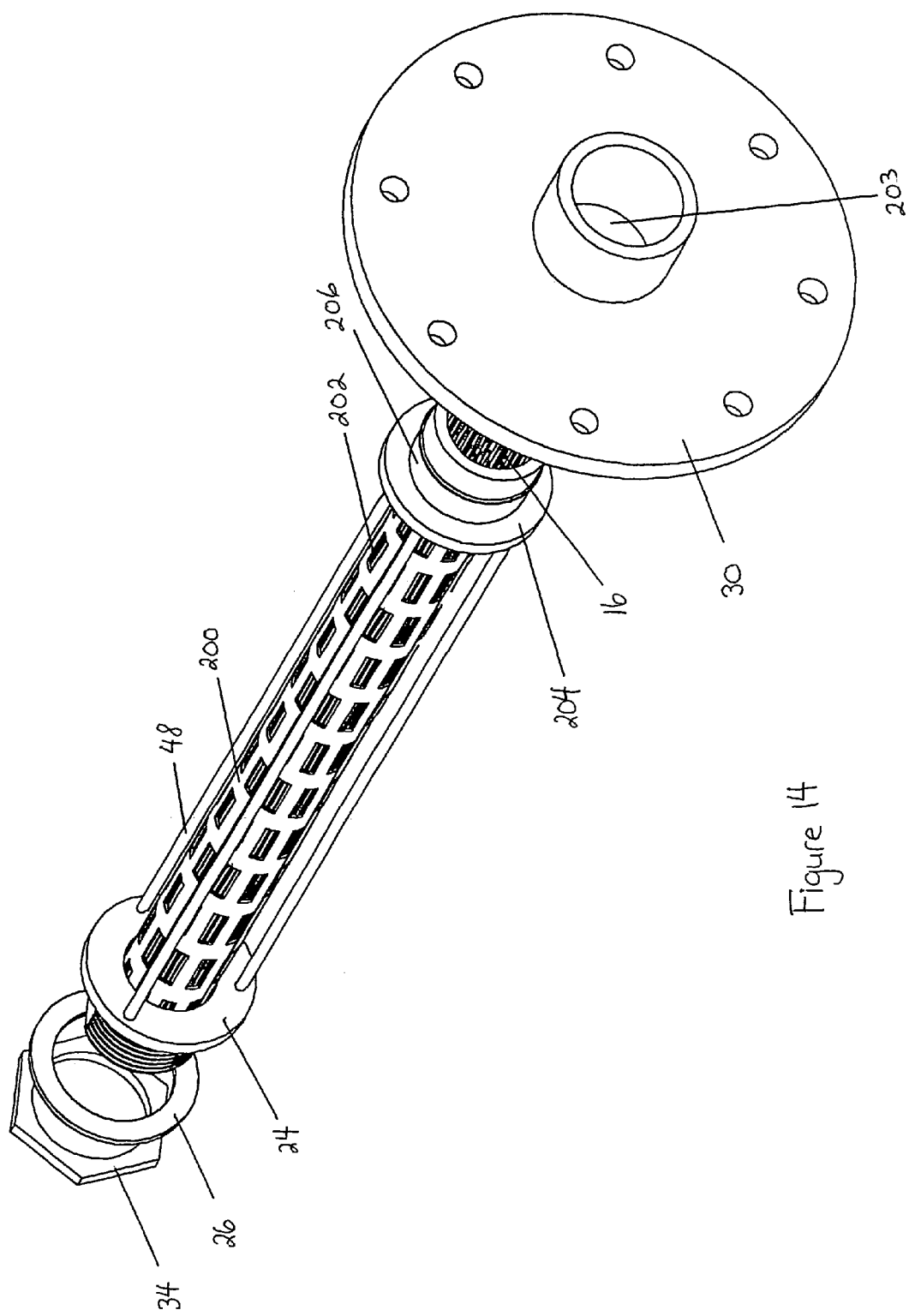
FIG. 14 is a perspective view of an embodiment of the single bundle of hollow fiber membranes having a one-piece protective casing.
Figure 15:
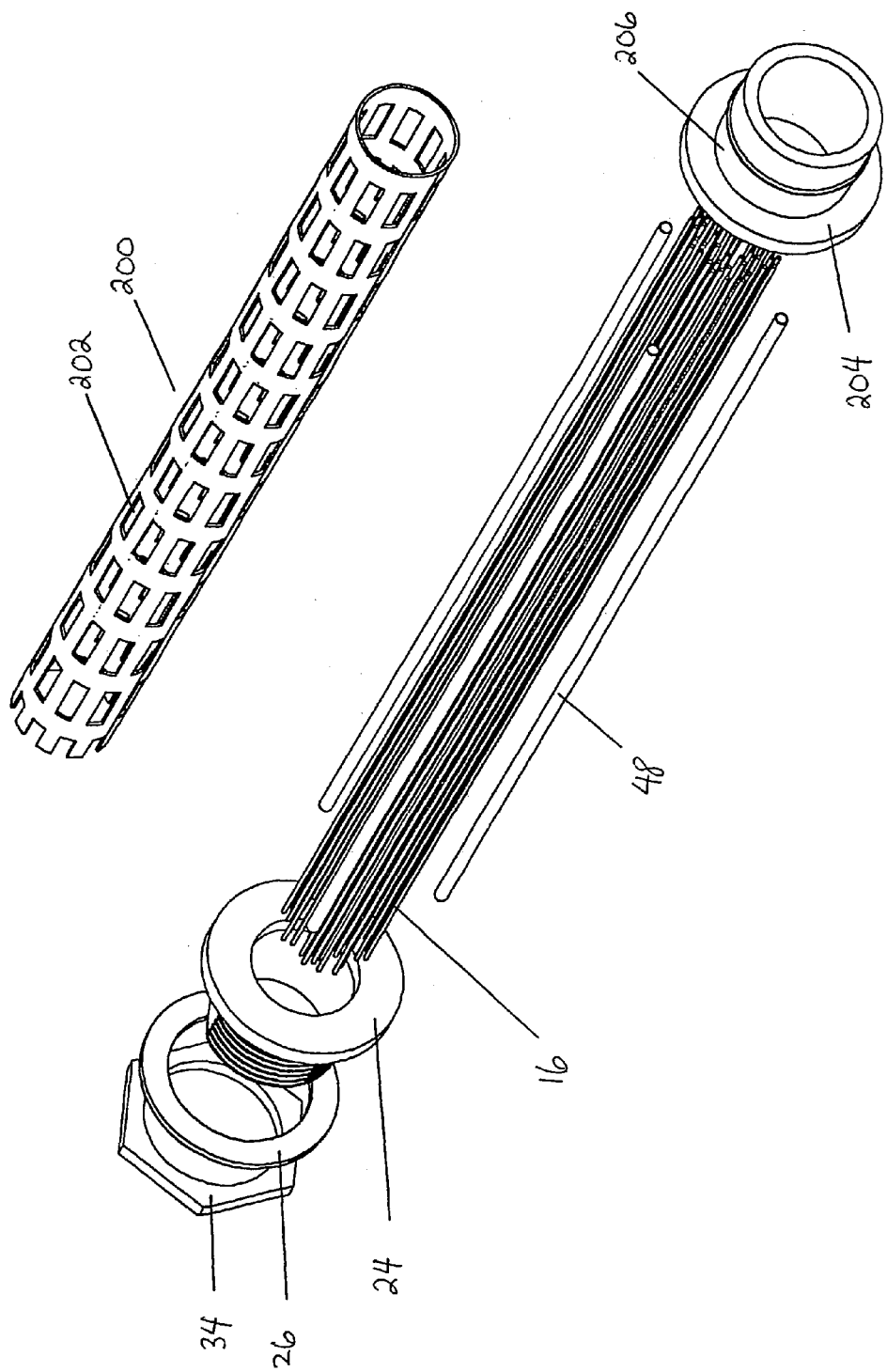
FIG. 15 is an exploded view of the bundle of hollow fiber membranes illustrated in FIG. 14.

In another embodiment of bundle design as illustrated in FIG. 14, one end of a bundle of membranes 16 is secured to the bundle end connector 24 and the opposite end of the bundle 16 is secured to the bundle support plate 30 in a fluid tight slip-fit engagement within an opening 203 in the bundle support plate 30. The fluid tight slip-fit engagement is effected by a slip-fit bundle end connector 204 and a sealant, for example an O-ring 206. The slip-fit bundle end connector 204 contains and holds together an end of the bundle 16 of hollow fiber membranes 14 by means of a tube sheet as described previously. An O-ring 206 surrounds a narrow portion of a slip-fit bundle end connector 204. The narrow portion of the slip-fit bundle end connector 204 and O-ring 206 are inserted into the lumen of an opening 203 in the bundle support plate 30. In this embodiment, force may be applied to the opposite axial end of the bundle 16 to push the combination O-ring 206 and slip-fit bundle end connector 204 into the opening 203 in the bundle support plate 30. The O-ring 206 acts to secure the narrow end of the slip-fit bundle end connector 204 in a fluid-tight seal within the opening 203 of the bundle support plate 30. If there is more than one bundle 16 of hollow fiber membranes connected to a bundle support plate 30, then the combination of slip-fit bundle end connector 20 and O-ring 206 is located at the end of the bundle 16 to be inserted into the bundle support plate 30. The bundle support plate 30 has the appropriate number of openings 203 in it to receive the slip-fit bundle end connector 20 and O-ring 206 assembly from each bundle 16. The advantage of this bundle arrangement is the ease in which bundles 16 of fiber membranes can be inserted into and removed from the housing 12. The ends of the bundles 16 containing the slip-fit bundle end connector 204 and O-ring 206 combination are merely physically pushed in or pulled out of the bundle support plate 30. Physical force is applied at the axially opposite end of the bundle 16 from the slip-fit end containing the bundle end connector 204 and O-ring 204 combination to install the bundles 16 and the support plate 30 is then installed to the housing 12. Given that physical force can be applied to install the bundle 16 of hollow fiber membranes, structural support means is helpful for the bundle 16 to counter such force. Such support means may be provided by using a rigid, not telescopic, sleeve 200 that at least in part surrounds the bundle 16 of hollow fiber membranes. The presence of supporting rods 48 are an additional but optional form of support means, but said rods, if present, would be preferably rigid and not telescopic.

Figure 17:
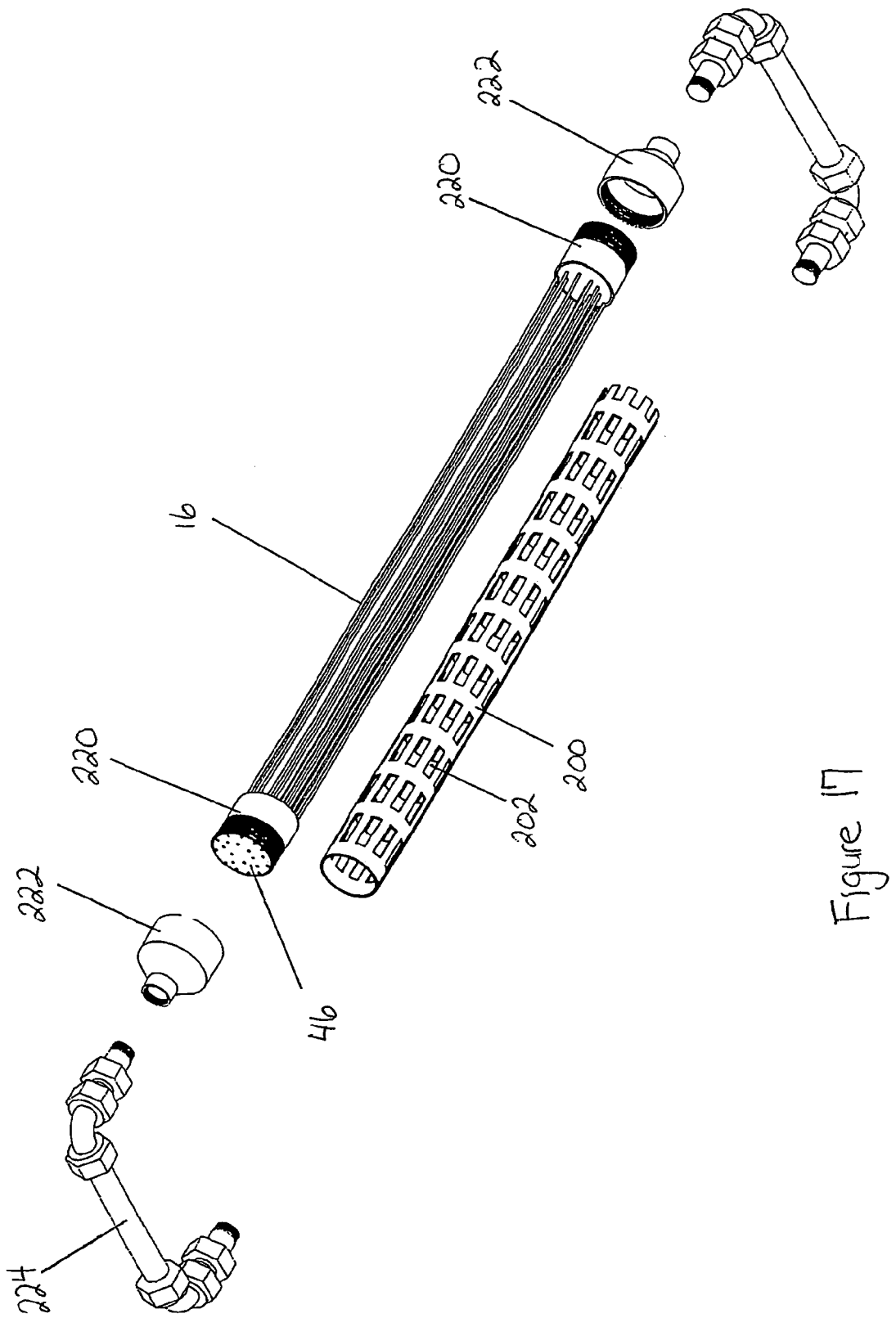
FIG. 17 is an exploded view of a bundle of fiber in the module of FIG. 16.

In yet another alternative bundle design, the ends of different bundles 16 of fiber membranes are interconnected in fluid-tight communication by conduits to create a series of serially connected bundles 16 of hollow fiber membranes through which the feed fluid mixture is conveyed. This arrangement is illustrated in FIG. 17. The ends of the fiber membranes 14 are contained within a conduit bundle end connector 220. A conduit bundle end connector 220 also uses a tube sheet 48 to contain and hold the ends of the hollow fiber membranes 14 within a bundle 16 as previously described. Within the lumen of the conduit bundle end connector 220, the ends of the hollow fiber membranes 14 are secured in place by a tube sheet 46 formed by potting material, for example, epoxy or other suitable material, which is conventional and known to someone skilled in the relevant art. The conduit bundle end connector 220 does not pass through the bundle support plate 30. Instead, a bundle end connector cap 222 is connected to the conduit bundle end connectors 220 on either end of the bundle 16 of hollow fiber membranes 14. This connection may for example be effected by a threaded connection between the bundle end connector cap 222 and the conduit bundle end connector 220. The bundle end connector cap 222 is hollow such that fluid passing in or out of the ends of the hollow fiber membranes 14, may pass through the bundle connector cap 222. A fluid conduit 224 attaches to the bundle end connector cap 224 at a second opening in said cap 222. The fluid conduit 224 is comprised of one or more components. The other end of said fluid conduit 224 connects to the bundle end connector cap 222 and conduit bundle end connector 220 assembly of a different bundle 16 of hollow fiber membranes. This arrangement permits two or more bundles 16 to be connected to one another, permitting fluid to pass through each bundle 16 of hollow fiber membranes in fluid-tight communication. In this embodiment, some or all of the bundles 16 of hollow fiber membranes may be surrounded by the sleeve 200.

Figure 18:
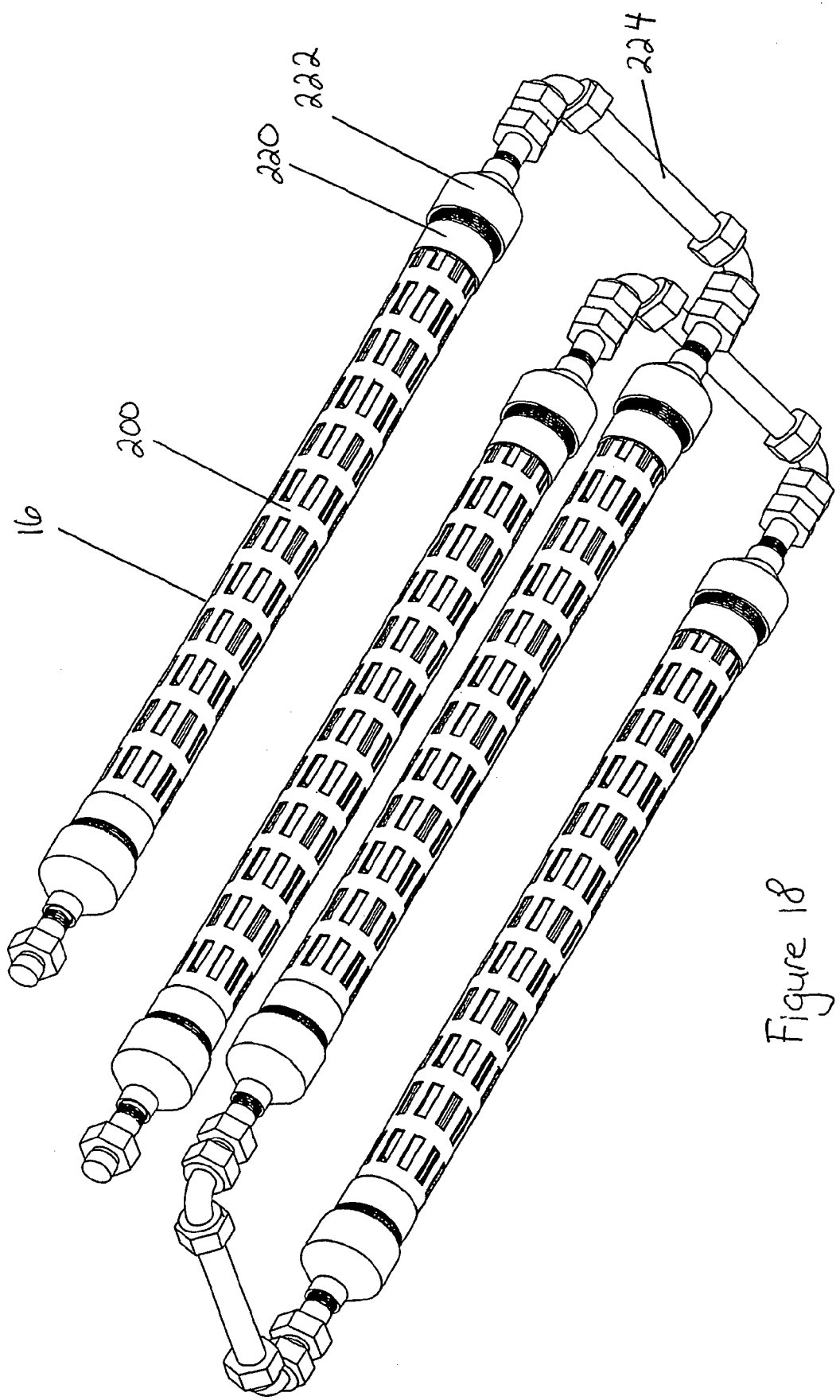
FIG. 18 is a perspective view of a group of bundles of fibers in the module of FIG. 16.

FIG. 18 illustrates several bundles 16 of hollow fiber membranes connected to one another in a series arrangement. This configuration permits fluid to pass through a connected bundles 16 of hollow fiber membranes.

The various configurations of bundle design described above have the advantage of flexibility and ease of assembly.

Operation of the Fluid Separation Module

The fluid separation module 10 may thus be used to separate fluid mixtures into permeate and retentate portions by means of membranes 14 arranged in bundles 16 adapted for fluid separation. The flow of the fluid mixture and resulting permeate and retentate through the fluid separation module will be first be described in detail with reference to FIGS. 2 and 5.

A feed fluid mixture enters the fluid separation module 10 through the feed inlet 42 and enters the feed inlet region 54 defined between the inlet endcap 40 and the bundle support plate 30. Within the feed inlet region 54, the ends 22 of the bundles 16 of hollow fiber membranes 14 embedded in tube sheets 46 are exposed to the feed fluid mixture. The feed fluid mixture enters the lumen of the individual hollow fiber membranes 14 contained within the membrane bundle or bundles 16. As the feed fluid mixture passes along the length of the hollow fiber membranes 14, the desired permeate traverses across the membrane walls and either passes directly into the permeate outlet region 50 beyond the bundles 16 of membranes 14, or first flows through the interstitial spaces between the membranes 14 within and between bundles 16 and then eventually flows to the permeate outlet region 50. The permeate collected within the permeate outlet region 50 exits the module 10 through permeate outlet 44.

As the feed fluid mixture moves along the length of the hollow fiber membranes 14, permeate continues to be extracted and the non-permeate (retentate) component or components of the feed fluid mixture becomes more concentrated. The retentate leaves the lumen of the hollow membrane fibers 14 at the second end of the membranes 14. As shown in FIG. 5, the second end of the hollow fiber membranes 14 communicate with the retentate outlet region 56 defined between the second bundle support plate 43 and the second endcap 41. The retentate exits the ends of the hollow fiber membranes 14 and enters the retentate fluid outlet region 56, from which the retentate leaves the module 10 through the retentate outlet 48.

Figure 8:
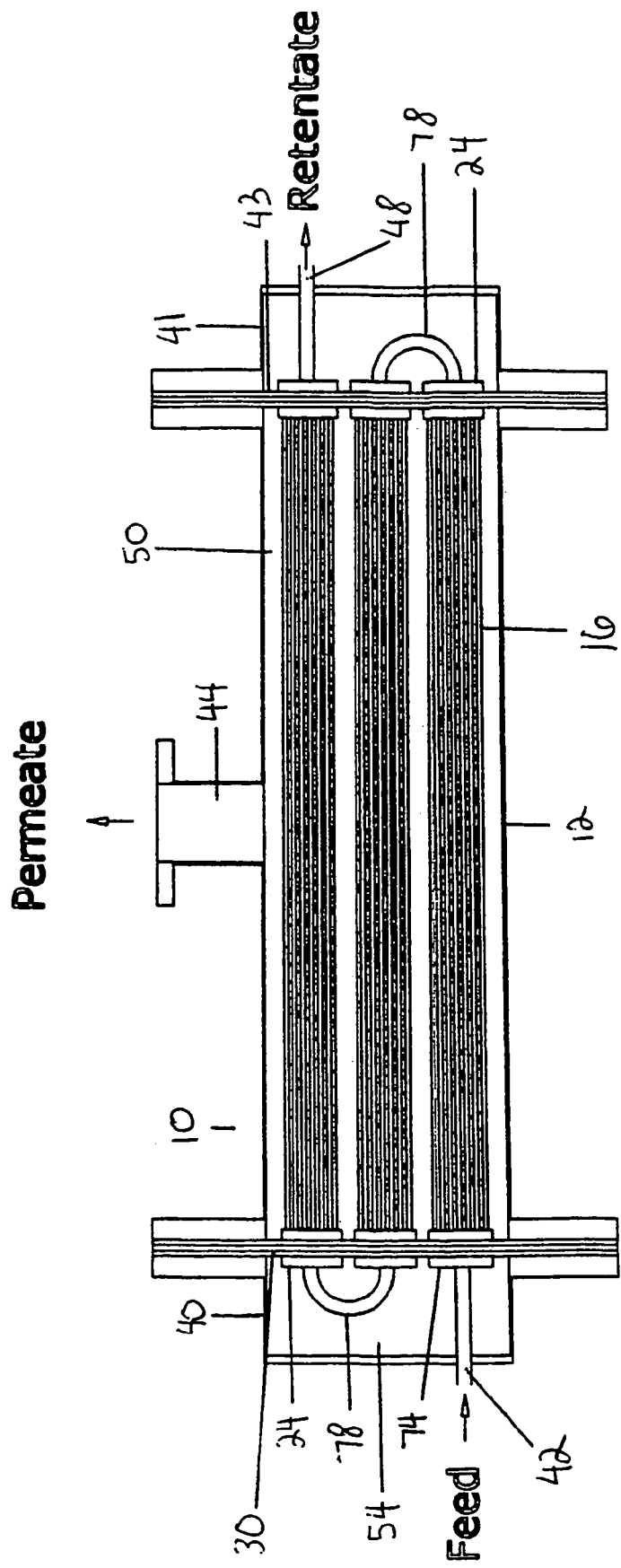
FIG. 8 is a schematic elevation of an alternative embodiment of the fluid separation module with serially connected bundles.

FIG. 8 illustrates an alternative embodiment of the apparatus of the invention, in which the fiber bundles 16 are connected in serial fashion. In this embodiment, the feed inlet region 54 does not serve as a manifold; rather, the feed fluid mixture enters the feed inlet 42 and is channelled directly into the hollow fiber membrane ends 22 of one or more selected bundle 16 of membranes 14 (one bundle 16 in the embodiment shown). The other bundles 16 have the ends 22 of their respective membranes 16 facing the feed inlet region 54 but connected to one another by means of sealed caps 74 overlaying the ends 22 and tubing 78 connecting the caps 74 in fluid-tight communication. The retentate exiting the outlet ends 22 of the initially selected bundle or bundles 16 of membranes 14 is thus connected by means of tubing 78 through caps 76 to the end of an adjacent bundle 16. The advantage of this arrangement is that the feed fluid mixture moves along the length of several hollow fiber membranes 14, increasing the separation time and allowing greater amounts of permeate to be extracted as the feed becomes more concentrated. The concentration of permeating portion in the retentate portion of the feed fluid mixture is much less in this serial arrangement of the bundles 16 than could be obtained by a parallel bundle configuration of similar bundle length and diameters as illustrated in FIG. 6. Another advantage to this arrangement is that bundles 16 of different types of membranes may be used in order to extract an array or plurality of permeate components from the feed fluid mixture.

A potential drawback experienced with the embodiment of FIG. 8 is that as the feed fluid mixture moves further along the series of interconnected bundles 16, the temperature of the feed may decrease depending on the separation process being used. In particular, where the passage of permeate through the membrane is accompanied by a phase change from liquid to vapour state (e.g. as occurs in pervaporation and vacuum membrane distillation) the temperature of the fluid mixture from which the permeate is separated decreases as a result of the expenditure of the latent heat of vaporization required for the phase change. This is more likely when the bundles 16 are arrange in series which results in higher amounts of permeate removal from the feed mixture. The reduction in fluid mixture temperature may cause a significant decrease in the efficiency of the fluid separation process as one of the forces driving the flow of permeate through the membranes is the partial pressure difference between the permeating portion in the feed fluid mixture and the side of the membrane exposed to the vacuum, namely the permeate outlet region 50. Although the partial pressure of the permeating component in the permeate outlet region 50 substantially remains the similar across the module 10, the partial pressure can decrease significantly with the decrease in temperature of the fluid feed mixture on the feed side of the membrane.

Figure 9:
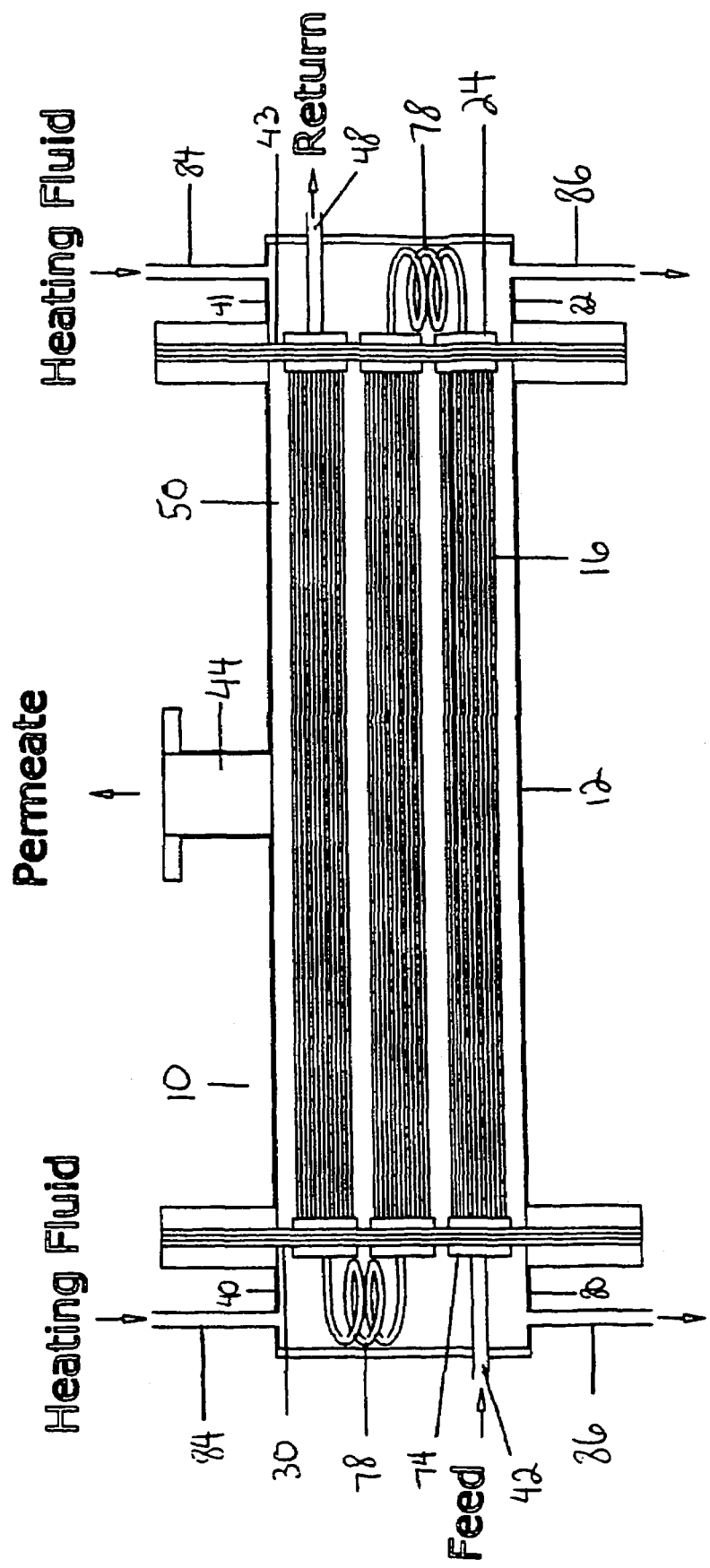
FIG. 9 is a schematic elevation of a further alternative embodiment of the fluid separation module with serially connected bundles.

FIG. 9 thus illustrates a further alternative embodiment of the fluid separation module 10 of the invention with serially connected bundles 16. In this embodiment, the interconnecting tubing 78 between the ends of the bundles 16 is located in the heating regions 80 and 82 which are defined by the areas on both sides of the housing 12, namely between the first endcap 40 and the first bundle support plate 30; and between the second endcap 41 and the second bundle support plate 43; which are isolated from the feed fluid by sealed caps 74, 76. Each heating area contains a heating fluid inlet 84 and a heating fluid outlet 86. A heating fluid is injected through the heating areas through the heating fluid inlet 84, passes over and heats the retentate flowing through the interconnecting tubes 78 and the feed inlet 42 and exits the heating areas 80 and 82 through the respective heating fluid outlets 86. To increase the efficiency of the heat transfer, the interconnecting tubes 78 may be made of material with high thermal conductivity, may be in the form of coil to provide more heat transfer area and/or may have fins on the outside surface to provide additional heat transfer surface. The source of the heating fluid may be from an external source or from a source recycled within the system. The heating fluid may be steam, heated glycol/water mixture, commercial heat transfer fluids or other similar fluid. The connecting tubes 78 in the illustrated embodiment are coiled, to increase the surface exposed area to the heating fluid and thus increase the rate of heat transfer.

Figure 16:
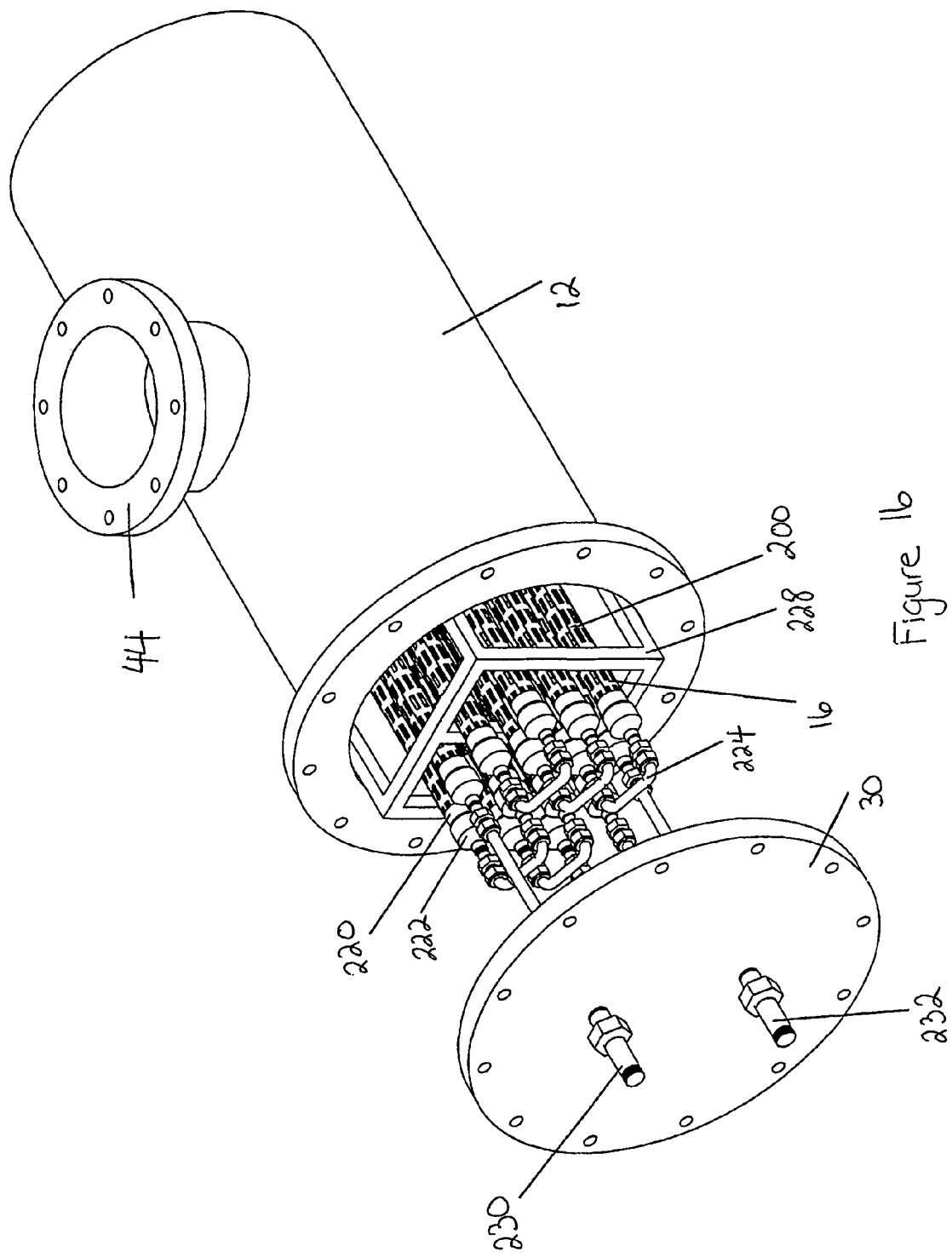
FIG. 16 is a perspective view of an alternative embodiment of the fluid separation module.
Figure 19:
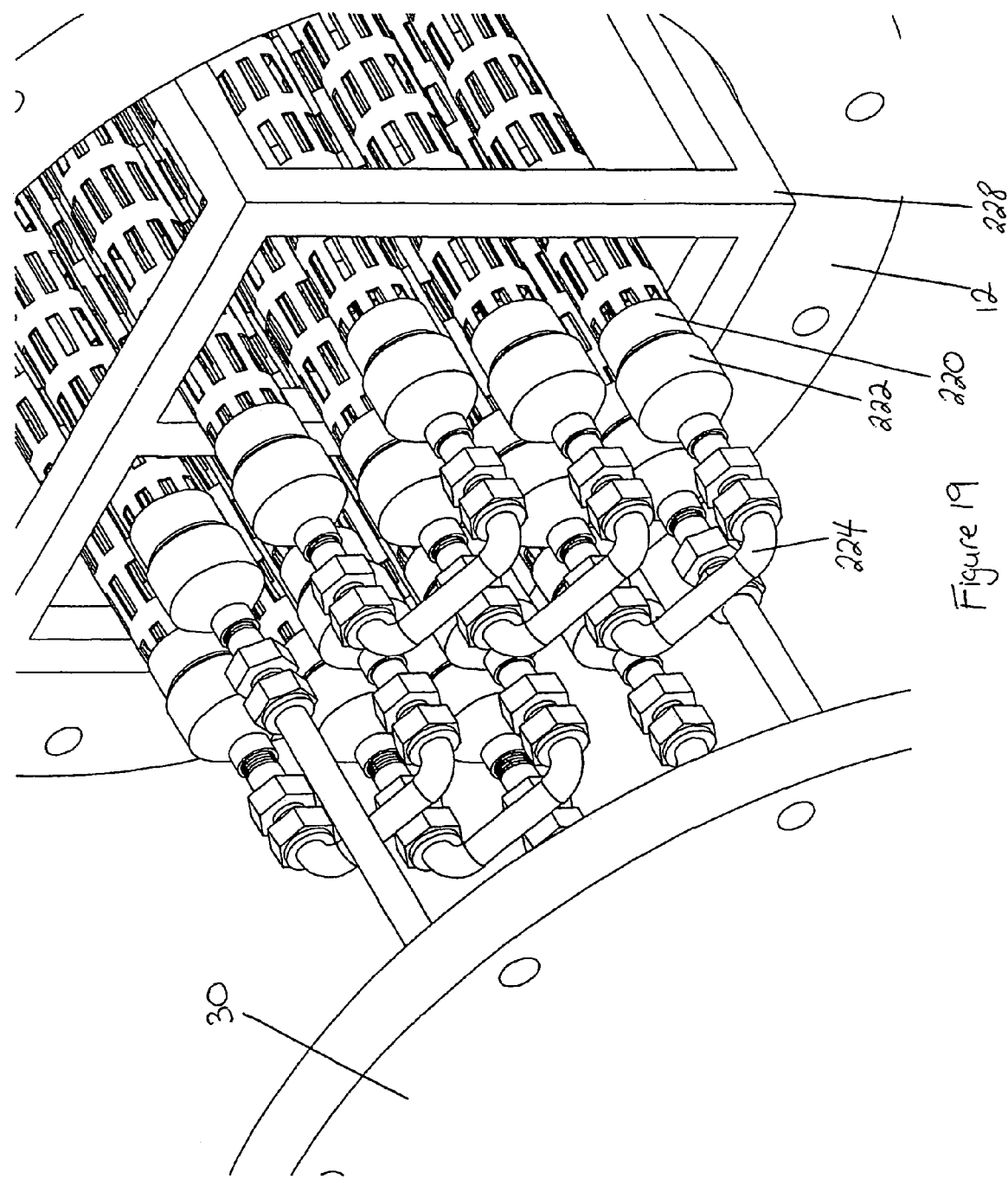
FIG. 19 is a partial perspective view interconnected bundles of fibers in the alternative module of FIG. 16.

FIG. 16 illustrates an embodiment of the invention, in which the fiber bundles 16 as illustrated in FIG. 17 are connected in serial fashion. However, in this embodiment, the bundles 16 of hollow fiber membranes are contained within a housing 12 that has an opening at only one end of the housing 12. The bundles 16 of hollow fiber membranes may be supported within the housing 12 by a support structure 228 of varying suitable designs and can be mechanically attached to the bundle support plate 30. At least one bundle 16 of hollow fiber membranes is attached to the bundle support plate 30 by a fluid inlet 230 through which fluid may pass from the exterior of the bundle support plate 30 and housing itself and eventually into the lumen of the hollow fiber membranes within the attached bundle 16. As a result, the fluid may pass through the lumen of the hollow fiber membranes within the bundles 16 that are serially connected to one another. The advantage of serially connecting the fiber bundles 16 is increased separation time for the fluid within the lumen of the hollow fiber membranes of the connected bundles 16 as compared to the separation time for fluid treated within bundles arranged in a parallel manner. After the fluid has passed through the bundles 16, the retentate exits the housing 12 through a retentate outlet 232. The retentate outlet 232 is attached at one end to at least one bundle 16 of hollow fiber membranes and said outlet passes through the bundle support plate 30. One advantage of this alternative configuration is the increased ease in which the entire group of bundles may be inserted into and removed from the housing 12. There is no need to remove both ends of the bundles 16 from bundle support plates 30 at both ends of the bundle. The group of bundles 16 attached to the single bundle support 30 act may act as a single unit. Another advantage is that the group of bundles 16 may be easily tested as a single unit for leaks prior to insertion and use in the housing. Instead of testing individual bundles 16 of hollow fiber membranes for leakage, the entire group of bundles 16 may be submerged in fluid outside of the housing and tested for leaks. For any leaks that are detected, the source of the leak can be identified and the specific bundle can be replaced. Then, the entire unit of bundles 16 may be easily inserted into the housing 12. Finally, this configuration, removes the need for endcaps 40 on one or both ends of the housing 12. The bundle support plate 30, may act as the external seal to the housing 12. A gasket or similar structure is placed between the bundle support plate 30 and the external seal. FIG. 19 provides a detailed view of the group of the bundles 16 of hollow fiber membranes contained within the housing 12.

Figure 21:
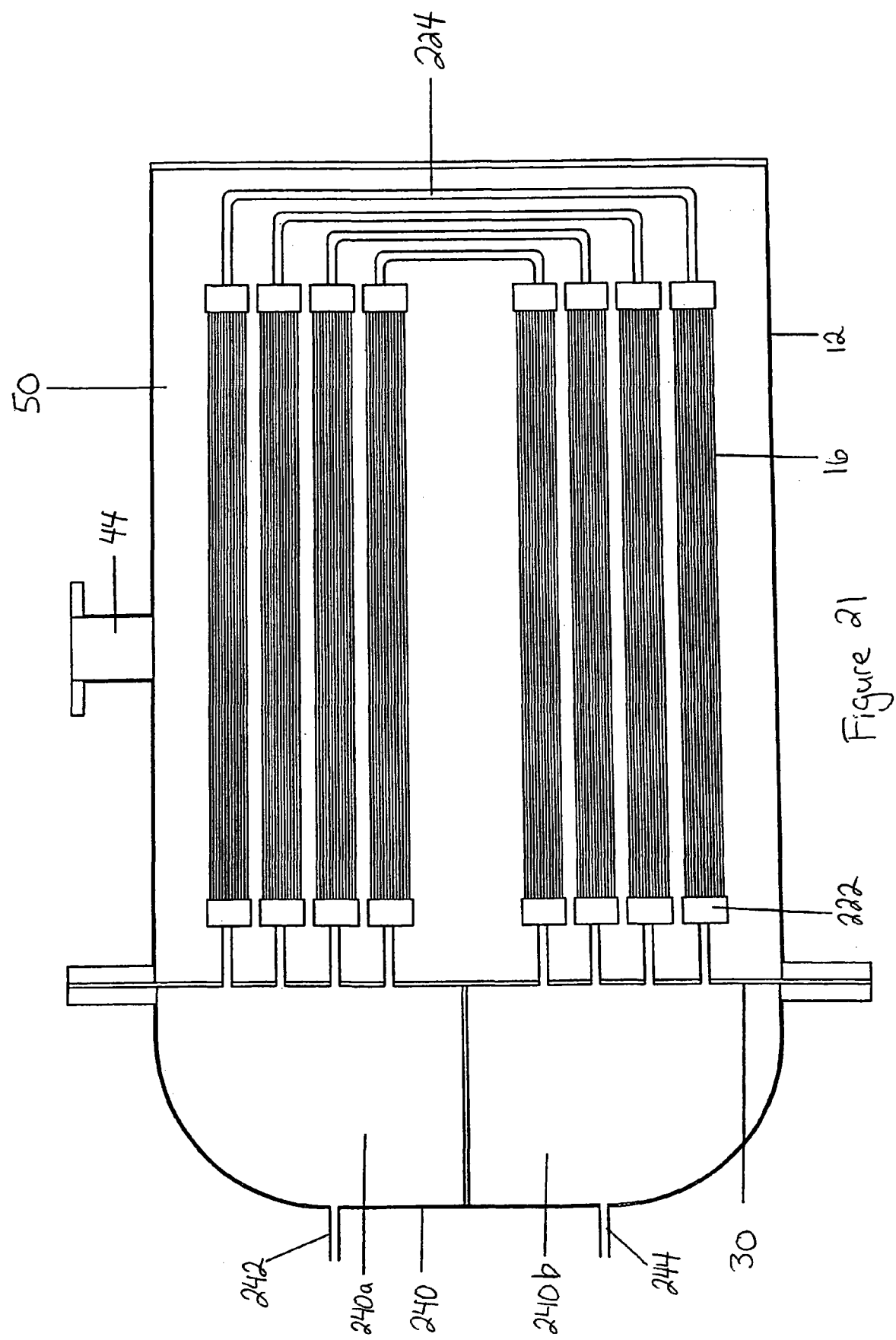
FIG. 21 is a schematic elevation of a further embodiment of the fluid separation module.

FIGS. 20A, 20B and 21 provide further alternative configurations for the housing 12. These alternative configurations illustrate that the variety of arrangement the bundles 16 may assume within the housing 12 to maximize the space within the housing 12 and that the structure of the housing 12 may assume different configurations. In each of these configurations, like the embodiment in FIG. 16, the housing 12 contains only one open end through which the bundles 16 of hollow fiber membranes are to be inserted.

FIG. 20A illustrates the group of bundles 16 of hollow fiber membranes connected to one another at their respective ends in a combination series and parallel arrangement. FIG. 20B illustrates the group of bundles 16 connected to one another at their respective ends in a series arrangement.

In the alternative embodiment shown in FIG. 21, the side of the housing 12 covered by the bundle support plate 30, is further covered by an endcap 240 such that there is a space between the interior of the endcap 240 and the bundle support plate 30. This space is divided into two separate compartments, 240a and 240b. Compartment 240a is connected to a feed inlet 242 through which feed passes through and communicates with the open ends of the bundle 16 hollow fiber membranes exposed through the bundle support plate 30. Similarly, compartment 240b receives the retentate that passes through the bundles 16 of hollow fiber membranes and the retentate exits the housing through the retentate outlet 244.

Fluid Separation Processes

The fluid separation process or combination of processes being practiced within the fluid separation module 10 will determine the nature of the membrane or membranes 14 being used. The fluid separation processes that may be effected within the fluid separation module includes but is not limited to, pervaporation, vapour permeation, membrane distillation (both vacuum membrane distillation and direct contact membrane distillation), ultra filtration, micro filtration, nanofiltration, reverse osmosis, membrane stripping and gas separation. Each of these processes is well known in the art. The hollow fiber membranes 14 may either be porous or non-porous. Generally, porous membranes are used in membrane distillation and membrane stripping and non-porous membranes are used in reverse osmosis and pervaporation applications. Moreover, depending on the fluid sought to be separated, the membranes 14 may be either hydrophobic, hydrophilic or organophillic.

When using the fluid separation module 10 in pervaporation and vacuum membrane distillation, a vacuum is applied outside the hollow fiber membranes 14. The permeable components from the feed fluid mixture permeate across the membranes and are extracted from the module 10 as vapour which can then be condensed to liquid.

In direct contact membrane distillation, hydrophobic micropourous membranes separate streams of fluids of differing temperature. For such processes the fluid separation module 10 is modified slightly to contain a separate fluid inlet (not shown) to allow the cooler fluid stream enter the module 10, run along the outside of the hollow fiber membranes 14 and eventually exit the module 10 via an outlet (not shown). The temperature gradient across the membranes causes water vapour to pass through the pores of the membranes and to condense on the other side of the membrane in the colder stream of fluid.

In ultrafiltration, microfiltration, nanofiltration and reverse osmosis, the feed fluid mixture in the module 10 is pressurized and portions of the feed permeate through the membrane and are removed as liquid.

In membrane stripping, membrane pores strip out a gas from a gas-liquid mixture and the permeate is removed as a gas.

The fluid separation module may be used for a host of other possible applications, including but not limited to:
- separation of organic liquid mixtures (pervaporation, vapour permeation);
- production of pure water suitable for pharmaceutical and food industries (vacuum membrane distillation or reverse osmosis);
- concentrate juices and fragrance compounds in the food and perfume industries, respectively (pervaporation or vacuum membrane distillation);
- removal of water from bio-reactors (pervaporation or vacuum membrane distillation);
- recycling of process solution by extracting diluents (vacuum membrane distillation);
- treatment of contaminated fluids (vacuum membrane distillation, reverse osmosis, ultrafiltration);
- separation of ultrafine particles and bacteria from water (ultrafiltration)

The fluid separation module of the invention is particularly well suited for the removal of VOCs from water by means of either membrane distillation or pervaporation. Where the membrane distillation process is used for this application, the membranes 14 will be porous and hydrophobic. For pervaporation processes, the membranes 14 will be non-porous and hydrophobic or organophilic.

Another particularly useful application for this invention is desalination by means of membrane distillation of seawater in which fresh water is removed from the fluid mixture as permeate. In this application, the membranes are porous and hydrophobic in composition. This prevents water in the liquid phase, with dissolved brine and other solids, from seeping through the membranes 14, while permitting pure water vapour to migrate through the membranes 14.

The application of the fluid separation module 10 to the removal of VOCs from water and to desalination of seawater will be discussed below in detail. However, these two applications are merely examples of the possible applications that this invention may perform and are not limiting.

Removal of Volatile Organic Compounds from ("VOCs") Water

Figure 10:
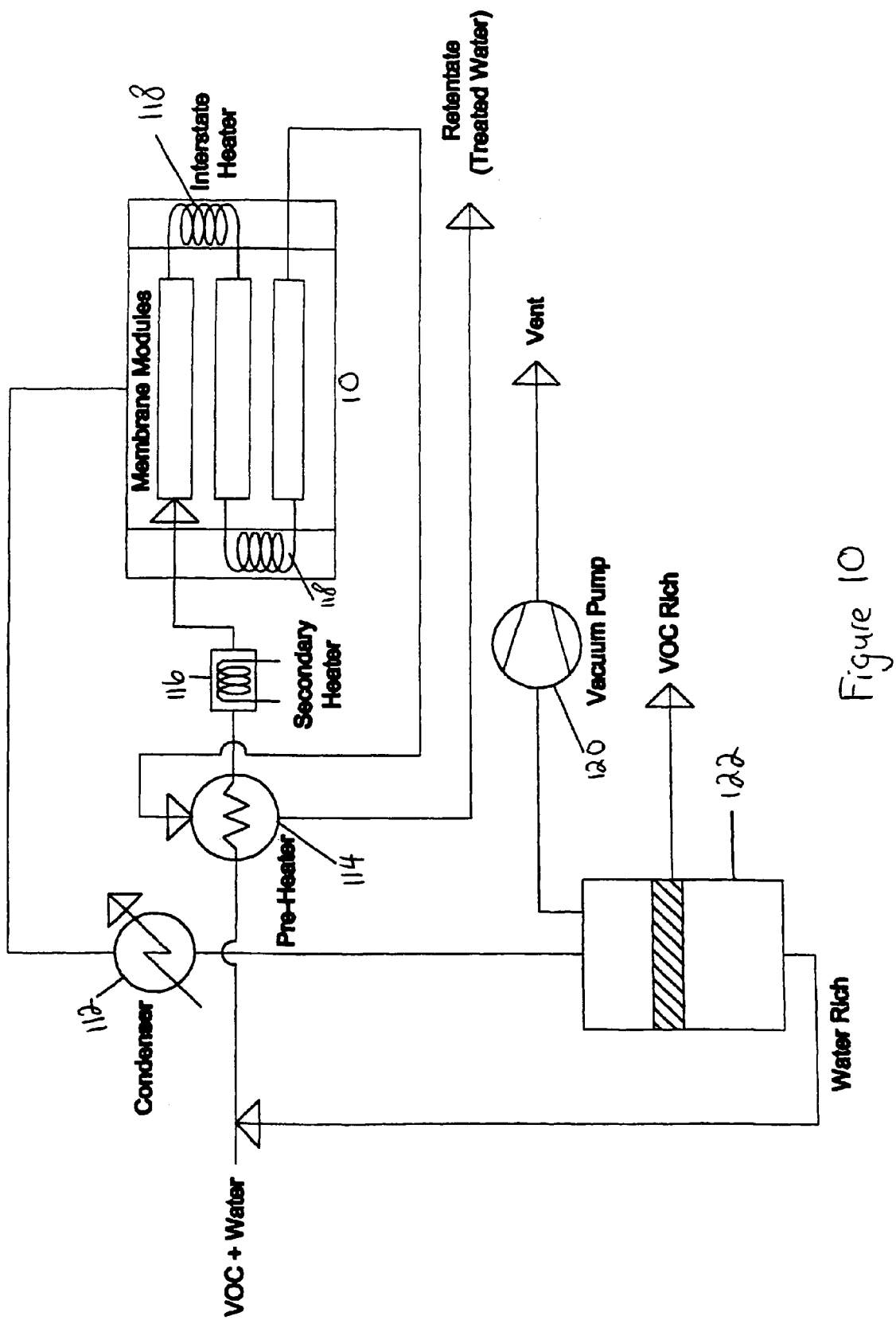
FIG. 10 is a schematic drawing of the flow of fluid in a system incorporating the fluid separation module for use in the removal of volatile organic compounds from water.

As illustrated in FIG. 10, the incoming feed (VOCs and water mixture) is supplied from a given source. The feed moves to heat exchanger 114 at which point the feed is heated further to a range from about 10° C. to about 80° C. by means of heat transfer from heated retentate (treated water) leaving the fluid separation module 10. The feed may pass a secondary heater 116, if required, at which point the feed reaches its optimum temperature range of about 15° C. to 98° C. and preferably in the vicinity of the boiling of water at the pressure at which the permeate outlet side of the module 10 is operated.

The feed enters the fluid separation module 10 in which permeate outlet region 50 is operating under vacuum or vacuum-like conditions with the preferred permeate side and sub-ambient pressures ranging from about 0.05 psia to about 14.6 psia and preferably between about 0.1 psia to about 12 psia. As the feed passes along the axial lengths of the lumen of the hollow fiber membranes 14, the feed continually loses permeate by evaporation through the membrane pores. Heat loss due to the evaporation of permeate may result in the temperature of the feed to drop significantly below the optimum operating temperature, especially when the bundles 16 of hollow fiber membranes 14 are arranged in series. In such circumstances where there is a significant drop in temperature, the feed is heated continuously by built-in inter-stage heaters 118.

The incoming feed enters the ends 22 of at least one bundle 16 of hollow fiber membranes 14 and travels along the axial length of the lumen of said bundle 16 and in turn passes along the axial lengths of the lumen of the other bundles 16 of hollow fiber membranes 16 within the fluid separation module 10.

As the feed moves along the length of the series of bundles 16 of hollow fiber membranes 14, the permeate consisting of VOC and trace amounts of water are extracted from feed. The permeate enters the permeate outlet region 50 of the fluid separation module 10 and exits through the permeate outlet 44. The escaping permeate is in vapour phase.

The permeate vapour leaving the separation module 10 through the outlet 44 are condensed and sub-cooled in a condenser 90 into liquid mixture of VOCs and water. The liquid permeate is then stored in a settling tank 122 where the VOCs are separated by means well known in the art from the water (e.g. separation by gravity). The VOCs are collected. The water rich phase is circulated back into the incoming feed. The non-condensable portions of the permeate, mainly dissolved gases and some traces of VOCs vapours in the feed, are constantly removed by a vacuum pump 120 attached to the gas settling tank and maintains the vacuum on the permeate site of the system. Vacuum pump effluents before venting may be first passed through a bed of activated carbon or similar adsorbent to remove traces of any entrained VOCs vapours (not shown).

A wide variety of types vacuum pumps which are known by one skilled in the art may be used including, but not limited, to rotary vane, rotary lobe type, or screw type. However, dry vacuum pumps (rotary lobe, screw type or others) capable of achieving the required with the internals that protect the contact of pumping medium with the pump internal lubricating oil, and which are specially designed for handling harsh fluids that the pump may be exposed to are preferred.

The retentate (in this process treated water) exits the end 22 of the one or more bundles 16 of hollow fiber membranes 14 and exits the module 10 through the retentate outlet 48. The temperature range for the retentate leaving said module 10 is between about 10° C. to about 95° C. The exiting retentate transfers heat to the incoming feed at pre-heater 114. Then the treated water is collected.

Internal Heat Recovery Method

Figure 1:
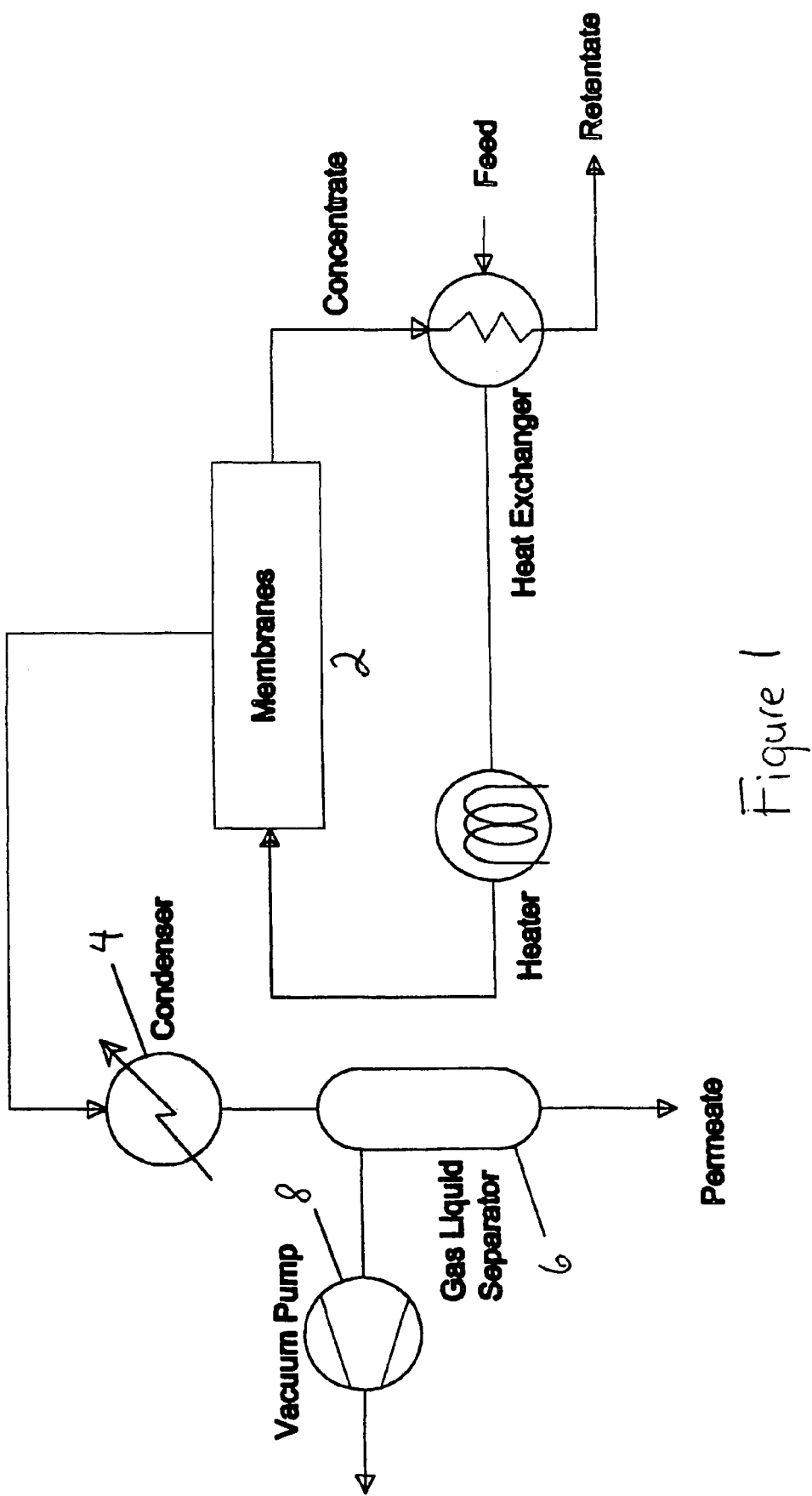
FIG. 1 is a schematic drawing of the flow of fluid during vacuum membrane distillation according to the prior art.
Figure 11:
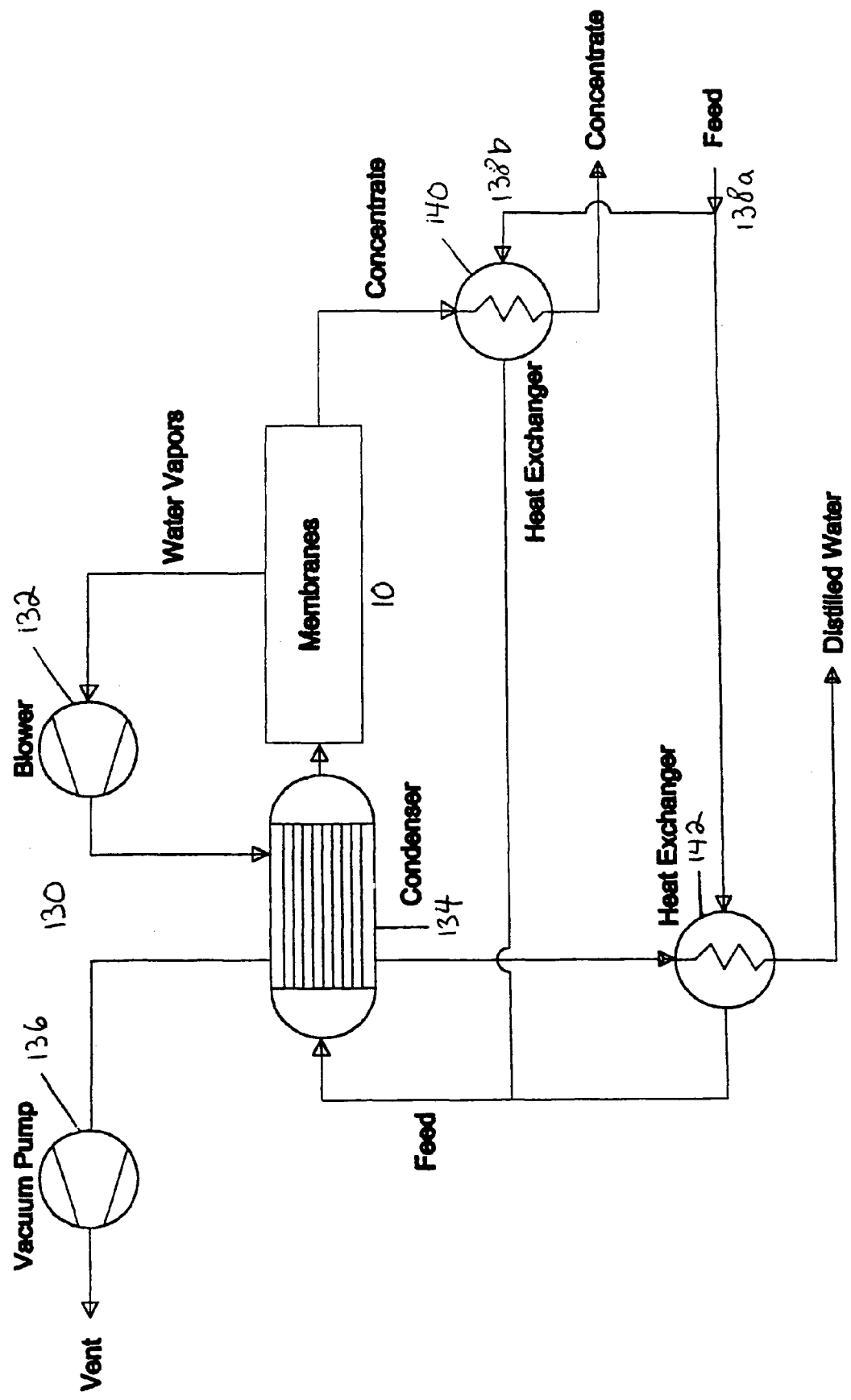
FIG. 11 is a schematic drawing of the flow of fluid in a system incorporating the fluid separation module in association with the internal heat recovery process for use in the desalination of seawater.

The present invention provides a novel method of internal heat recovery 130 where the permeate heat of vaporization is transferred back to the incoming feed by employing a blower/compressor 132 to compress the permeate vapours exiting the membrane-assisted fluid separation module 10 as illustrated in FIG. 11. In contrast to the prior art shown in FIG. 1, permeate vapours exiting the module are first condensed in a condenser 134 using a cooling fluid source. The novel method in the present invention may be applied in membrane-assisted fluid separation applications which have significant evaporation of permeate through the membranes 14.

In the present invention, the compressor outlet temperature varies significantly according to the ratio of compressor outlet and compressor inlet pressures (called compression ratio). The higher the compression ratio, the higher will be compressor outlet temperature. A compression ratio anywhere between 1.02 to 50.0 and preferably 1.2 to 10 can be used to increase the compressor outlet temperatures by anywhere from few degrees Celsius to several hundred degrees Celsius, although other compression ratios may be appropriate in some processes.

The terms "blower" and "compressor" are terms used herein interchangeably for devices with low compression ratios. Actual selection of a blower/compressor will vary from application to application and will be apparent to one skilled in the art. Centrifugal or rotary positive displacement type blowers/compressors may be used. The centrifugal compressors/blowers are preferred as they provide less pulsation in the system, offer higher energy efficiency, and are suitable for handling large volumetric flow rates that may be necessary for large industrial scale operation. These compressors should have adequate sealing mechanism to operate under vacuum and should not contaminate the permeate vapours by their internal lubricating oil.

One possible way of controlling the compressor outlet pressure is by adjusting the condenser operating pressure. This is achieved by using a means of creating a vacuum in the condenser 134, such as a secondary vacuum pump 136 illustrated in FIG. 11. This secondary vacuum pump 136 constantly removes the non-condensable portions of the permeate from the condenser 134 and maintains the desired pressure in it.

By adjusting the optimum compression ratio the temperature of permeate vapour exiting the compressor 132 can be adjusted to a value slightly higher than the module feed inlet temperature. These vapours when condensed in the condenser 134 at temperatures higher than the feed temperature result in the transfer of latent heat from vaporization to the incoming liquid feed on the other side of the condenser 134 and brings the feed temperature to the desired module inlet conditions.

Application of this internal heat recovery method makes the vacuum membrane distillation highly energy efficient and makes it a feasible process even for application where separation takes place by evaporating a significant fraction of feed into permeate through the membrane.

Desalination and contaminated water purification are examples of applications that may utilize the of method internal heat recovery as taught by this invention. In these applications, large portions of feed are separated by a membrane into a high purity water permeate stream by evaporation through the membranes and a retentate stream with higher concentration of non-permeating components such as dissolved salts, other soluble impurities and non-volatile compounds. The method of internal heat recovery is not limited to these two examples, but this method may be applied to any membrane-assisted fluid separation application which has significant evaporation of permeate through said membranes.

Desalination

Both the module and the method of internal heat recovery disclosed by the present invention can be used in association with one another in certain applications where membrane-assisted fluid separation takes place by evaporating a significant fraction of the feed into permeate through the membrane. Desalination of seawater by means of vacuum membrane distillation is one example. Removal of low concentrations VOCs from water differs because a significant fraction of the feed is not evaporated into permeate.

FIG. 11 outlines the flow pattern scheme for desalination utilizing this novel method of heat recovery. The incoming feed (e.g. saltwater) is supplied from a particular source (e.g. the sea) and is initially split into two streams 138a and 138b respectively. One feed split stream is heated by heated retentate that has left the fluid separation module 10 at heat exchanger 140. The other feed split stream is heated by means of heat transfer from the heated permeate at heat exchanger 142. Feed side effluents of the two exchangers 140 and 142 are then combined into one feed stream such that the combined feed temperature ranges from about 40° C. to about 85° C. At the condenser 134, the feed is heated further to a preferred temperature range between 50° C. and 100° C. by the permeate before the feed fluid enters the fluid separation module 10 at a pressure of about 15 psia to about 40 psia.

Permeate outlet region of the fluid separation module 10 is operating under vacuum or vacuum-like conditions with the preferred permeate side and sub-ambient pressures ranging from about 0.05 psia to about 14.6 psia and preferably between about 0.1 psia to about 12 psia As the feed passes along the axial lengths of the lumen of the hollow fiber membranes 14, the feed continually looses permeate by evaporation through the membrane pores.

Depending on the temperature of feed and the vacuum level in the retentate outlet side of the separation module 10, the temperature of permeate vapour exiting the module 10 can range from about 30° C. to 90° C. These permeate vapours are heated by the compressor 132 to increase its temperature to provide sufficient driving force for heat transfer to take place between the heated permeate vapours and colder feed entering the condenser 134. Compressed vapour temperature can range from about 50° C. to 200° C.

The retentate exits the fluid separation module 10 at a temperature lower than the incoming feed fluid mixture but still greater than the temperature of the feed fluid mixture coming from the feed source. At the heat exchanger 140 the heated retentate (concentrate) is used to heat one incoming feed split stream. A portion of the outgoing heated retentate can be recycled back with the incoming feed to extract more pure water from it if required.

Of the different fluid separation processes that may be used in the fluid separation module 10, pervaporation, vapour permeation and membrane distillation all preferably heat the incoming feed fluid mixture and may require inter-stage heaters for series operation.

The operating temperatures and pressures provided above, particularly for the examples of removal of VOCs from water and desalination are given as a reference only and can deviate significantly within and outside of the ranges specified. These parameter ranges largely depend on, but are not limited to, factors such as the composition and properties of the fluid mixtures to be separated, types of membranes used, and composition of the permeate and retentate.

Preferred embodiments of the invention having been thus described by way of example, it will be apparent to those skilled in the art that certain modifications and adaptations may be made without departing from the scope of the invention, as set out in the appended claims.

What is claimed is:

1. A fluid separation apparatus comprising:
    a. a hollow housing defining a separation chamber, having at least one permeate outlet to permit one or more permeate components of a feed fluid mixture to exit the housing;
    b. at least one feed inlet for feeding the feed fluid mixture into the housing;
    c. at least one bundle of hollow fiber membranes being supported along its length by at least two telescoping rods, contained within the housing having first and second open ends, the first ends being in fluid communication with a feed inlet, the ends of a bundle of hollow fiber membranes each being secured by a holding member comprising a tube sheet, such that the ends of the hollow fiber membranes are exposed to the feed inlet and retentate outlet, respectively;

d. at least one retentate outlet to permit one or more non-permeate components of the feed fluid mixture to exit the housing; and e. the bundle of hollow fiber membranes being enclosed in a sleeve that has openings, the sleeve protecting the physical integrity of the hollow fiber membranes contained within said sleeve but allowing the passage of fluids through the sleeve;

whereby the feed fluid mixture passes through the hollow fiber membranes such that the one or more permeate components of the feed fluid mixture migrate across the walls of the membranes to a permeate region defined between the fiber membranes and an interior wall of the housing, and the one or more retentate portions of the feed fluid mixture pass along the length of the membranes to the retentate outlet.

2. The apparatus of claim 1 wherein the housing has two open ends which are sealed by first and second sealing members respectively, each sealing member comprising openings through which the ends of the bundle of membranes is inserted, whereby the ends of the hollow fiber membranes are exposed to a region external to each sealing member.

3. The apparatus of claim 2 wherein each end of the bundle of membranes is secured by a holding member having a threaded portion, and the bundle is secured to each sealing member by threaded members engaging the threaded portions of the holding members.

4. The apparatus of claim 2 wherein one end of the bundle of membranes is secured to a holding member by threaded members engaging threaded portions of the holding member, and the opposite end of the bundle of membranes is secured to the sealing member in a fluid-tight slip fit engagement.

5. The apparatus of claim 2 wherein a first endcap is secured to an inlet end of the housing such that a feed inlet region is defined between the first endcap and the first sealing member.

6. The apparatus of claim 5 wherein a second endcap is secured to an outlet end of the housing such that a retentate outlet region is defined between the second endcap and the second sealing member.

7. The apparatus of claim 6 wherein the first endcap comprises a feed inlet.

8. The apparatus of claim 7 wherein retentate exits the fiber membranes into the retentate outlet region.

9. The apparatus of claim 8 wherein the second endcap comprises a retentate outlet.

10. The apparatus of claim 5 wherein the feed inlet passes through the first endcap and supplies feed fluid mixture directly to the end of at the bundle of hollow fiber membranes in fluid-tight relation.

11. The apparatus of claim 1 wherein the housing has one open end sealed by means of a sealing member containing at least one opening through which a feed inlet passes whereby the feed inlet connects to the ends of at least one bundle of membranes by means of a connecting member, and said sealing member contains at least one opening through which a retentate outlet passes, whereby the retentate outlet connects to the ends of at least one bundle of membranes.

12. The apparatus of claim 11, wherein the two or more bundles of membranes are connected to one another in series.

13. The apparatus of claim 11, wherein the two or more bundles of membranes are connected to one another in parallel.

14. The apparatus of claim 6 wherein two or more bundles of membranes are physically supported by a bearing means against the interior of the housing.

15. The apparatus of claim 11 wherein one or more endcaps is secured to the end of the housing such that a feed inlet region is defined between said endcap and the sealing member, and a retentate outlet region is defined between said endcap and the sealing member, and the feed inlet region and retentate outlet region are physically separate from one another.

16. The apparatus of claim 15, wherein the endcap creating the feed inlet region has at least one opening through which a feed inlet passes and empties feed into said feed inlet region.

17. The apparatus of claim 16, wherein the endcap creating the retentate outlet region has at least one opening through which a retentate outlet passes and permits retentate within the retentate outlet region to exit the housing.

18. The apparatus of claim 1 wherein each rod consists of at least three rod portions, comprising two end rods each having one end fixed into the medial surface of a holding member and a medial rod, whereby opposite ends of the medial rod engage the two end rods in a telescoping relation.

19. The apparatus of claim 1 wherein the sleeve consists of two or more elements that move telescopically in relation to one another.

20. The apparatus of claim 1 wherein permeate traverses the walls of the hollow fiber membranes by means of pervaporation, vapour permeation, membrane distillation including vacuum membrane distillation, direct contact membrane distillation, ultra filtration, microfiltration nanofiltration, reverse osmosis, membrane stripping, gas separation or a combination thereof.

21. The apparatus of claim 1 for use in the process of desalination.

22. The apparatus of claim 21 wherein the housing operates under a vacuum conditions with the-permeate side and sub-ambient pressures ranging from about 0.05 psia to about 14.4 psia.

23. The apparatus of claim 22 wherein the housing operates under a vacuum conditions with the permeate side and sub-ambient pressures ranging from about 0.1 psia to about 12.0 psia.

24. The apparatus of claim 22 wherein the hollow fiber membranes are porous.

25. The apparatus of claim 22 wherein the hollow fiber membranes are hydrophobic.

26. A method for separating fresh water from saltwater utilizing the apparatus of claim 1, comprising the steps of:

a. heating a saltwater feed entering the fluid separation apparatus;

b. separating a permeate of water vapour from the saltwater under vacuum or vacuum-like conditions;

c. passing the water vapour through a compressor or blower to increase the temperature of the water vapour;

d. passing the heated water vapour through a heat exchanger to heat the saltwater feed and condense the water vapour; and e. collecting the condensed water.

27. The apparatus of claim 26 wherein the hollow fiber membranes are porous.

28. The apparatus of claim 26 wherein the hollow fiber membranes are hydrophobic.

29. A fluid separation apparatus comprising:

a hollow housing defining a separation chamber, having at least one permeate outlet to permit one or more permeate components of a feed fluid mixture to exit the housing, the housing having two open ends which are sealed by first and second sealing members respectively, each sealing member comprising openings through which the ends of the bundle of membranes is inserted, whereby the ends of the hollow fiber membranes are exposed to a region external to each sealing member;

a first endcap secured to an inlet end of the housing such that a feed inlet region is defined between the first endcap and the first sealing member;

a second endcap secured to an outlet end of the housing such that a retentate outlet region is defined between the second endcap and the second sealing member;

at least one feed inlet for feeding the feed fluid mixture into the housing;

at least one bundle of hollow fiber membranes being supported along its length by at least two telescoping rods, contained within the housing having first and second open ends, the first ends being in fluid communication with the feed inlet; and at least one retentate outlet to permit one or more nonpermeate components of the feed fluid mixture to exit the housing;

whereby the feed fluid mixture passes through the hollow fiber membranes such that the one or more permeate components of the feed fluid mixture migrate across the walls of the membranes to a permeate region defined between the fiber membranes and an interior wall of the housing, and the one or more retentate portions of the feed fluid mixture pass along the length of the membranes to the retentate outlet and a first heating area is defined in the feed inlet region and a second beating area is defined, in the retentate outlet region the first and second heating areas each providing at least one heating fluid inlet and at least one heating fluid outlet to allow the passage of heated fluid therethrough.

30. The apparatus of claim 10 wherein the ends of the bundles of hollow fiber membranes are interconnected in fluid-tight communication by conduits to create a series of serially connected bundles of hollow fiber membranes through which the feed fluid mixture is conveyed to the retentate outlet.

31. The apparatus of claim 30 wherein the feed fluid mixture is separated into permeate and retentate portions by means of pervaporation, vapour permeation, membrane distillation including vacuum membrane distillation, direct contact membrane distillation, ultra filtration, microfiltration nanofiltration, reverse osmosis, membrane stripping, gas separation or a combination thereof.

32. The apparatus of claim 29 wherein the conduits are disposed within in the first and second heating areas.

33. The apparatus of claim 32 wherein the feed fluid mixture is heated within the conduits by heated fluid passing over said conduits within the first and second heating areas.

34. The apparatus of claim 33 wherein the feed fluid mixture is separated into permeate and retentate portions by means of pervaporation, vapour permeation, membrane distillation including vacuum membrane distillation, direct contact membrane distillation, ultra filtration, microfiltration nanofiltration, reverse osmosis, membrane stripping, gas separation or a combination thereof.

35. The apparatus of claim 34 wherein the feed inlet passes through the first endcap and supplies feed fluid mixture directly to the end of at the bundle of hollow fiber membranes in fluid-tight relation.

36. The apparatus of claim 35 wherein the ends of the bundles of hollow fiber membranes are interconnected in fluid-tight communication by conduits to create a series of serially connected bundles of hollow fiber membranes through which the feed fluid mixture is conveyed to the retentate outlet.

37. The apparatus of claim 36 wherein the conduits are disposed within in the first and second heating areas.

38. A fluid separation apparatus comprising:
   a. a hollow housing defining a separation chamber, having at least one permeate outlet to permit one or more permeate vapour components of a feed fluid mixture to exit the housing;
   b. at least one feed inlet for feeding the feed fluid mixture into the housing;
   c. at least one bundle of hollow fiber membranes being supported along its length by at least two telescoping rods, contained within the housing having first and second open ends, the first ends being in fluid communication with a feed inlet;
   d. at least one retentate outlet to permit one or more nonpermeate components of the feed fluid mixture to exit the fluid separation module;
   e. at least. one compressor for compressing and heating the one or more permeate vapour components of the feed fluid mixture; and
   f. at least one heat exchanger within the housing for transferring heat from the compressed permeate to the feed inlet mixture;

whereby the feed fluid mixture passes through the hollow fiber membranes such that the one or more permeate components of the feed fluid mixture migrate across the walls of the membranes to a permeate region defined between the fiber membranes and an interior wall of the housing, and the one or more retentate portions of the feed fluid mixture pass along the length of the membranes to the retentate outlet.

39. The apparatus of claim 38 where the heat exchanger includes a condenser for condensing the one or more permeate vapour components;

whereby latent heat of vapounzation is transferred from the one or more permeate vapour components to the feed inlet mixture.

40. The apparatus of claim 39 where the condenser includes a pump for removing non-condensable portions of the one or more permeate vapour components of feed fluid mixture whereby a partial-vacuum is maintained in the condenser.

41. The apparatus of claim 37 wherein the feed fluid mixture is heated within the conduits by heated fluid passing over said conduits within the first and second heating areas.

* * * * *